US008669332B2

(12) United States Patent
Carrillo et al.

(10) Patent No.: US 8,669,332 B2
(45) Date of Patent: *Mar. 11, 2014

(54) POLY(ARYLENE ETHER)-POLYSILOXANE COMPOSITION AND METHOD

(75) Inventors: Alvaro Carrillo, Delmar, NY (US); Hua Guo, Selkirk, NY (US)

(73) Assignee: Sabic Innovative Plastics IP B.V. (NL)

(*) Notice: Subject to any disclaimer, the term of this patent is extended or adjusted under 35 U.S.C. 154(b) by 240 days.

This patent is subject to a terminal disclaimer.

(21) Appl. No.: 13/169,137

(22) Filed: Jun. 27, 2011

(65) Prior Publication Data

US 2012/0329961 A1 Dec. 27, 2012

(51) Int. Cl.
*C08L 71/12* (2006.01)
*C08G 77/46* (2006.01)

(52) U.S. Cl.
USPC ............... 525/393; 528/29; 528/86; 528/212

(58) Field of Classification Search
None
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,465,319 A | 3/1949 | Whinfield |
| 2,512,606 A | 6/1950 | Bolton et al. |
| 2,720,502 A | 10/1955 | Caldwell |
| 2,727,881 A | 12/1955 | Caldwell |
| 2,822,348 A | 2/1958 | Haslam |
| 3,047,539 A | 7/1962 | Pengilly |
| 3,379,792 A | 4/1968 | Finholt |
| 3,671,487 A | 6/1972 | Abolins |
| 3,716,589 A | 2/1973 | Kotanigawa et al. |
| 3,953,394 A | 4/1976 | Fox et al. |
| 3,979,464 A | 9/1976 | Leach |
| 4,128,526 A | 12/1978 | Borman |
| 4,128,728 A | 12/1978 | Arnold et al. |
| 4,226,761 A | 10/1980 | Cooper et al. |
| 4,283,574 A | 8/1981 | Leach |
| 4,301,308 A | 11/1981 | Canavesi et al. |
| 4,546,093 A | 10/1985 | Chang et al. |
| 4,664,972 A | 5/1987 | Connolly |
| 4,769,424 A | 9/1988 | Takekoshi et al. |
| 4,814,392 A | 3/1989 | Shea et al. |
| 4,822,836 A | 4/1989 | Wroczynski |
| 4,871,816 A | 10/1989 | Percec et al. |
| 4,879,346 A | 11/1989 | Bopp et al. |
| 4,970,272 A | 11/1990 | Gallucci |
| 5,021,543 A | 6/1991 | Mayska et al. |
| 5,032,635 A | 7/1991 | Avakian et al. |
| 5,061,746 A | 10/1991 | Gallucci et al. |
| 5,110,896 A | 5/1992 | Waggoner et al. |
| 5,132,365 A | 7/1992 | Gallucci |
| 5,169,887 A | 12/1992 | Snow et al. |
| 5,204,438 A | 4/1993 | Snow et al. |
| 5,230,359 A | 7/1993 | Ollivier |
| 5,258,455 A | 11/1993 | Laughner et al. |
| 5,281,686 A | 1/1994 | Blohm et al. |
| 5,294,655 A | 3/1994 | Lee, Jr. et al. |
| 5,357,003 A | 10/1994 | Smits et al. |
| 5,357,022 A | 10/1994 | Banach et al. |
| 5,364,898 A | 11/1994 | Lee, Jr. et al. |
| 5,385,984 A | 1/1995 | Blohm et al. |
| 5,470,913 A | 11/1995 | Van der Meer et al. |
| 5,484,858 A | 1/1996 | Smits et al. |
| 5,561,193 A | 10/1996 | Gottschalk et al. |
| 5,596,048 A | 1/1997 | Blohm et al. |
| 5,612,425 A | 3/1997 | Weber et al. |
| 5,618,885 A | 4/1997 | Kotek et al. |
| 5,625,011 A | 4/1997 | Palsule |
| 5,693,700 A | 12/1997 | Venkataramani et al. |
| 5,714,550 A | 2/1998 | Shaw |
| 5,750,603 A | 5/1998 | Asrar |
| 5,817,891 A | 10/1998 | Brocker et al. |
| 5,916,952 A | 6/1999 | Romenesko et al. |
| 6,025,419 A | 2/2000 | Kasowski et al. |
| 6,043,315 A | 3/2000 | Gottschalk et al. |

(Continued)

FOREIGN PATENT DOCUMENTS

| | | |
|---|---|---|
| CA | 2052488 | 4/1992 |
| EP | 0133641 A1 | 3/1985 |

(Continued)

OTHER PUBLICATIONS

International Search Report and Written Opinion; International Application No. PCT/US2012/042175; International Filing Date Jun. 13, 2012; Date of Mailing Mar. 12, 2013; 10 pages.
Final Office Action for U.S. Appl. No. 12/644,272, Notification Date Dec. 15, 2011, 14 pages.
Final Office Action for U.S. Appl. No. 12/644,144, Notification Date Feb. 14, 2012, 14 page.
International Search Report for International Application No. PCT/US2012/069337, International Application Filing Date Dec. 13, 2012; Date of Mailing Apr. 22, 2013, 5 pages.
Written Opinion for International Application No. PCT/US2012/069337, International Application Filing Date Dec. 13, 2012; Date of Mailing Apr. 22, 2013, 4 pages.

(Continued)

*Primary Examiner* — Marc Zimmer
(74) *Attorney, Agent, or Firm* — Cantor Colburn LLP

(57) ABSTRACT

A thermoplastic composition that includes a poly(arylene ether)-polysiloxane block copolymer is prepared by a method that includes oxidatively copolymerizing a monohydric phenol and a hydroxyaryl-terminated polysiloxane. The oxidative polymerization includes a monohydric phenol addition period characterized by a first temperature, a build period following the addition period and characterized by a second temperature greater than the first temperature, and a temperature ramp period between the addition period and the build period. During the temperature ramp period, the temperature is increased at an average rate of about 0.01 to about 0.35° C. per minute, which improves the efficiency with which the hydroxyaryl-terminated polysiloxane is incorporated into the poly(arylene ether)-polysiloxane block copolymer.

34 Claims, 12 Drawing Sheets

(56) References Cited

U.S. PATENT DOCUMENTS

| | | | |
|---|---|---|---|
| 6,072,011 A | 6/2000 | Hoover | |
| 6,093,771 A | 7/2000 | Wunsch et al. | |
| 6,339,131 B1 | 1/2002 | Cella et al. | |
| 6,593,411 B2 | 7/2003 | Koevoets et al. | |
| 6,875,824 B2 | 4/2005 | Fishburn | |
| 7,034,099 B2 | 4/2006 | Kamps et al. | |
| 7,087,666 B2 | 8/2006 | Hoerold et al. | |
| 7,115,677 B2 | 10/2006 | Harashina et al. | |
| 7,148,276 B2 | 12/2006 | Bauer et al. | |
| 7,151,158 B2 | 12/2006 | Ingelbrecht | |
| 7,166,243 B2 | 1/2007 | Elkovitch et al. | |
| 7,255,814 B2 | 8/2007 | Hoerold et al. | |
| 7,259,200 B2 | 8/2007 | Bauer et al. | |
| 7,273,901 B2 | 9/2007 | Sicken et al. | |
| 7,329,708 B2 | 2/2008 | Birsak et al. | |
| 7,332,534 B2 | 2/2008 | Knop et al. | |
| 7,432,311 B2 | 10/2008 | Mezzenga et al. | |
| 7,439,288 B2 | 10/2008 | Sicken et al. | |
| 7,449,507 B2 | 11/2008 | Fishburn | |
| 7,449,508 B2 | 11/2008 | Steib et al. | |
| 7,488,766 B2 | 2/2009 | Peters et al. | |
| 7,534,822 B2 | 5/2009 | Elkovitch et al. | |
| 7,541,421 B2 | 6/2009 | Carrillo et al. | |
| 7,550,534 B2 | 6/2009 | Zhao et al. | |
| 7,553,912 B2 | 6/2009 | Ikuta et al. | |
| 7,576,150 B2 | 8/2009 | Klei et al. | |
| 7,582,692 B2 | 9/2009 | Kosaka et al. | |
| 7,592,382 B2 | 9/2009 | Borade et al. | |
| 7,608,651 B2 | 10/2009 | Borade et al. | |
| 7,652,107 B2 | 1/2010 | Gallucci et al. | |
| 7,772,322 B2 | 8/2010 | Kosaka et al. | |
| 7,803,856 B2 | 9/2010 | Perego et al. | |
| 7,816,438 B2 | 10/2010 | Seki et al. | |
| 7,838,580 B2 | 11/2010 | Bauer et al. | |
| 7,847,032 B2 * | 12/2010 | Guo et al. | 525/393 |
| 8,017,697 B2 | 9/2011 | Carrillo et al. | |
| 2005/0250885 A1 | 11/2005 | Mercx et al. | |
| 2006/0111548 A1 | 5/2006 | Elkovitch et al. | |
| 2006/0111549 A1 | 5/2006 | Elkovitch et al. | |
| 2006/0167143 A1 | 7/2006 | Borade et al. | |
| 2007/0208144 A1 | 9/2007 | Delsman et al. | |
| 2007/0208159 A1 | 9/2007 | McCloskey et al. | |
| 2008/0071036 A1 | 3/2008 | Delsman et al. | |
| 2009/0318635 A1 * | 12/2009 | Carrillo et al. | 525/474 |
| 2011/0152420 A1 * | 6/2011 | Elkovitch et al. | 524/133 |
| 2011/0152431 A1 * | 6/2011 | Elkovitch et al. | 524/430 |
| 2011/0152471 A1 | 6/2011 | Kamalakaran et al. | |
| 2011/0190453 A1 | 8/2011 | Carrillo et al. | |
| 2011/0190454 A1 | 8/2011 | Carrillo et al. | |
| 2011/0319552 A1 * | 12/2011 | Bastiaens et al. | 524/538 |

FOREIGN PATENT DOCUMENTS

| | | | |
|---|---|---|---|
| EP | 0683209 A2 | 5/1995 | |
| EP | 0714951 A1 | 6/1996 | |
| EP | 1253164 A1 | 10/2002 | |
| GB | 1353501 | 5/1974 | |
| JP | 1986252214 | 11/1986 | |
| JP | 6-200038 | 7/1994 | |
| JP | 2004231789 A | 8/2004 | |
| WO | 8707281 | 12/1987 | |
| WO | 9711123 A1 | 3/1997 | |
| WO | 9808898 | 3/1998 | |
| WO | 0140353 A1 | 6/2001 | |
| WO | 2007106296 A2 | 9/2007 | |

OTHER PUBLICATIONS

U.S. Appl. No. 12/277,835 Final Office Action, notification date Dec. 1, 2010, 12 pages.
U.S. Appl. No. 12/331,802 Non-Final Office Action, notification date Jan. 27, 2010, 13 pages.
U.S. Appl. No. 12/644,221 Non-Final Office Action, notification date May 2, 2011, 31 pages.
U.S. Appl. No. 12/644,272 Non-Final Office Action, notification date Jul. 18, 2011, 28 pages.
U.S. Appl. No. 13/043,502 Non-Final Office Action, notification date Jun. 2, 2011, 11 pages.
Albemarle, "Saytex HP-3010, Flame Retardant", 2008 Albemarle Corporation, 2 pages.
Allen et al., "Synthesis and properties of xylenyl ether-dimethylsiloxane triblock polymers", Polymer Bulletin 19, 1988, pp. 103-110.
Chan et al., "Facile Quantitative Analysis of Hydroxyl End Groups of Poly(2,6-dimethyl-1, 4-phenylene oxide)s by 31P NMR Spectroscopy", Macromolecules, vol. 27, pp. 6371-6375, Abstract, 1994.
Clariant, "Exolit Overview", Nov. 2008 edition, 7 pages.
Clairant, "Exolit OP 1312 Flame Retardants PHP", Product Data Sheet, Edition Feb. 4, 2009, 2 pages.
JP2002047409A, Abstract, Feb. 12, 2002, 1 pages.
JP2003105193A, Abstract, Apr. 9, 2003, 1 page.
JP2005333698A, Abstract, Dec. 2, 2005, 1 page.
JP3126744A, Abstract, May 29, 1991, 1 page.
JP405230360A, Abstract, Sep. 7, 1993, 1 page.
JP4077552A, Abstract, Mar. 11, 1992, 1 page.
JP57195122A, Abstract, Nov. 30, 1982, 1 page.
JP6200015A, Abstract, Jul. 19, 1994, 1 page.
JP63202652A, Abstract, Aug. 22, 1988, 1 page.
JP9003322A, Abstract Jan. 7, 1997, 1 page.
JP9279044, Abstract, Oct. 28, 1997, 1 page.
Pape et al., "The Role of Silicone Powders in Reducing the Heat Release Rate and Evolution of Smoke in Flame REtardant Thermoplastics", J. of Vinyl & Additive Tech., vol. 3, No. 3, 1997, pp. 225-231.
PCT/IB2010/055482 International Search Report, date of mailing May 13, 2011, 4 pages.
PCT/IB2010/055482 Written Opinion, date of mailing May 13, 2011, 6 pages.
PCT/US2009/064110 International Search Report, date of mailing May 27, 2010, 8 pages.
PCT/US2009/064110 Written Opinion, date of mailing May 27, 2010, 5 pages.
PCT/US2010/058146 International Search Report, date of mailing Aug. 16, 2011, 5 pages.
PCT/US2010/058146 Written Opinion, date of mailing Aug. 16, 2011, 4 pages.
PCT/US2010/058166 International Search Report, date of mailing Aug. 17, 2011, 5 pages.
PCT/US2010/058166 Written Opinion, date of mailing Aug. 17, 2011, 4 pages.
Skoog et al., "Principles of Instrumental Analysis", 4th Edition, Sanders College Publishing, 1992, pp. 568-578.
Weil et al., "Flame Retardants for Plastics and Textiles", Practical Applications, Hanswer Publications, 2009, pp. 88-90 and 100-101.
U.S. Appl. No. 12/644,221 Final Office Action, notification date Sep. 28, 2011, 21 pages.
U.S. Appl. No. 13/043,506 Non-Final Office Action, notification date Sep. 15, 2011, 37 pages.
Final Office Action for U.S. Appl. No. 13/043,506, Notification Date Dec. 16, 2011, 12 pages.
Final Office Action for U.S. Appl. No. 13/043,502, Notification Date Dec. 16, 2011, 38 pages.
DE3834086 A1, Apr. 19, 1990, Abstract Only, 2 pages.
U.S. Appl. No. 13/902,671, filed May 24, 2013.
U.S. Appl. No. 13/902,671 filed with the USPTO on May 24, 2013.

* cited by examiner

US 8,669,332 B2

POLY(ARYLENE ETHER)-POLYSILOXANE COMPOSITION AND METHOD

BACKGROUND OF THE INVENTION

Block copolymers comprising a poly(arylene ether) block and a polysiloxane block are known materials that are useful components of various thermoplastic and thermoset compositions. Their polysiloxane content makes them particularly useful as flame retardant additives. They can also be employed as compatibilizers to stabilize otherwise poorly compatible blends of polysiloxanes with aromatic polymers, such as polystyrenes, poly(arylene ether)s, aromatic polyesters, aromatic polyamides, and aromatic polyimides.

Some known methods for preparing poly(arylene ether)-polysiloxane block copolymers involve the linking of preformed poly(arylene ether) and polysiloxane groups to each other. For example, in U.S. Pat. No. 4,871,816 to Percec et al., silyl hydride-terminated polysiloxane blocks are linked to vinyl-terminated polyarylene polyether blocks via a hydrosilylation reaction. Thus, these known methods involve at least three steps, the first step to form a poly(arylene ether) block with reactive terminal functionality, the second step to form a polysiloxane block with at least one end group capable of reacting with the poly(arylene ether) reactive terminal functionality, and the third step to covalently link the poly(arylene ether) and polysiloxane blocks.

It would be efficient and economically advantageous to prepare poly(arylene ether)-polysiloxane copolymers with fewer processing steps, and some efforts have been made toward this end. For example, Banach et al. in U.S. Pat. No. 5,357,022 have reported the oxidative coupling of 2,6-xylenol (2,6-dimethylphenol) and a silicone macromer having terminal phenol groups. However, attempts to reproduce the reaction conditions of Banach et al. have resulted in products in which much of the phenol-terminated silicone macromer is not covalently linked to a polyphenylene ether block and the isolated product as a whole has a relatively low intrinsic viscosity (typically about 0.2 deciliter per gram). The reaction products of Banach are therefore of limited use as flame retardant additives or compatibilizers, because they tend to segregate into two distinct and poorly compatible phases, one consisting largely of polyphenylene ether homopolymer, and the other consisting largely of unreacted phenol-terminated silicone macromer.

In U.S. Patent Application Publication No. 2009/0318635, Carrillo et al. report a method for making poly(arylene ether)-polysiloxane block copolymers having polysiloxane incorporation efficiencies as high as 91 to 100 percent. However, in Carrillo's working examples, these high efficiencies were only achieved when the polysiloxane was 5 weight percent of the total monomer charge. When the polysiloxane loading was increased to 20 weight percent of the total monomer charge, the polysiloxane incorporation efficiency dropped to 26 to 72 percent.

There is therefore a need for improved methods of synthesizing poly(arylene ether)-polysiloxane block copolymers with improved incorporation of the polysiloxane into the desired block copolymers, particularly at high polysiloxane loadings.

BRIEF DESCRIPTION OF EMBODIMENTS OF THE INVENTION

One embodiment is a method of preparing a thermoplastic composition, comprising oxidatively copolymerizing a monohydric phenol and a hydroxyaryl-terminated polysiloxane; wherein said oxidatively polymerizing the monohydric phenol and the hydroxyaryl-terminated polysiloxane comprises a monohydric phenol addition period characterized by a first temperature, a build period following the addition period and characterized by a second temperature greater than the first temperature, and a temperature ramp period between the addition period and the build period; and wherein the temperature ramp period comprises increasing the temperature at an average rate of about 0.01 to about 0.35° C. per minute.

Another embodiment is a thermoplastic composition prepared by the above described method.

Another embodiment is a thermoplastic composition, comprising: a poly(arylene ether); and a poly(arylene ether)-polysiloxane block copolymer comprising a poly(arylene ether) block, and a polysiloxane block comprising, on average, about 20 to about 80 siloxane repeating units; wherein the thermoplastic composition comprises greater than 8 to about 30 weight percent siloxane repeating units and about 70 to less than 92 weight percent arylene ether repeating units, based on the total weight of the poly(arylene ether) and the poly(arylene ether)-polysiloxane block copolymer; wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of at least 30,000 atomic mass units.

Another embodiment is a polymer blend, comprising: about 5 to about 95 weight percent of a thermoplastic composition, comprising a poly(arylene ether); and a poly(arylene ether)-polysiloxane block copolymer comprising a poly(arylene ether) block, and a polysiloxane block comprising, on average, about 20 to about 80 siloxane repeating units; wherein the thermoplastic composition comprises greater than 8 to about 30 weight percent siloxane repeating units and about 70 to less than 92 weight percent arylene ether repeating units, based on the total weight of the poly(arylene ether) and the poly(arylene ether)-polysiloxane block copolymer; wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of at least 30,000 atomic mass units; and about 5 to about 95 weight percent of a polymer selected from the group consisting of polystyrenes, polyamides, polyolefins, polyesters, and combinations thereof.

These and other embodiments are described in detail below.

DETAILED DESCRIPTION OF THE INVENTION

Figure 1:
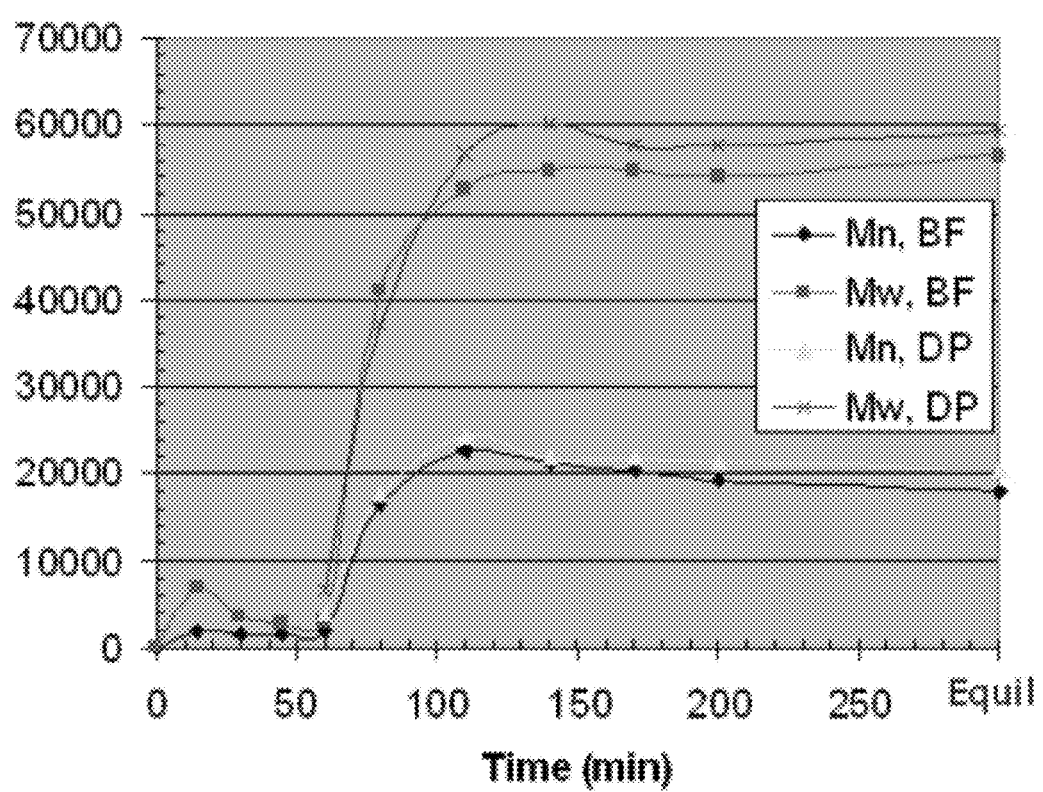
FIG. 1 is a plot of number average molecular weight ($M_n$) and weight average molecular weight ($M_w$) as a function of reaction time for reaction product solution ("BF" for "body feed") and the isolated product ("DP" for "dry product") of Example 3. "Equil" refers to the sample after equilibration of the reaction product solution with chelating agent.

The present inventors have determined that in the formation of poly(arylene ether)-polysiloxane block copolymer by oxidative copolymerization of a monohydric phenol and a hydroxyaryl-terminated polysiloxane, substantially improved efficiencies for the incorporation of hydroxyaryl-terminated polysiloxane into the poly(arylene ether)-polysiloxane block copolymer are achieved by decreasing the rate at which the reaction temperature is increased between the so-called addition period (during which monohydric phenol is added to the reaction mixture) and the so-called build period (during which equilibration of reaction components occurs. Rate of temperature increase was identified as an experimental variable in the inventors' previous work, published as U.S. Patent Application Publication No. US 2009/0318635 A1 of Carrillo et al. (hereinafter "Carrillo US 2009/0318635 A1"), but there was no indication in that work that the variable was result-effective for improving the efficiency of incorporation of hydroxyaryl-terminated polysiloxane. To the contrary, the experiments in the previous work suggest that the efficiency of hydroxyaryl-terminated polysiloxane incorporation was either insensitive to the rate of temperature increase between the addition period and the build period, or, in one case, increased slightly as the rate of temperature change increases. See, especially, Carrillo US 2009/0318635 A1 at page 11, Table 2, Examples 4, 3, and 5, where "ramp slope" varied from 0.37 to 1.1 to 2.2° C./minute, respectively, other process parameters were held constant (other than ramp time, which is linked to ramp slope), and the corresponding siloxane incorporation efficiency varied from 96 to 98 to 100%, respectively; pages 11-12, Table 2, Examples 6 and 7, where "ramp slope" was 1.9 or 0.63° C./minute, respectively, other process parameters were held constant (other than ramp time, which is linked to ramp slope), and the corresponding siloxane incorporation efficiency was 94% and 94%, respectively. In contrast, the present work shows, surprisingly, that in reaction mixtures using higher concentrations of hydroxyaryl-terminated polysiloxane, the efficiency of hydroxyaryl-terminated polysiloxane incorporation increases at reduced average temperature change rates of about 0.01 to about 0.35° C./minute (i.e., at rates below those tested in Carrillo US 2009/0318635 A1).

Thus, one embodiment is a method of preparing a thermoplastic composition, comprising oxidatively copolymerizing a monohydric phenol and a hydroxyaryl-terminated polysiloxane; wherein said oxidatively polymerizing the monohydric phenol and the hydroxyaryl-terminated polysiloxane comprises (is characterized by) a monohydric phenol addition period characterized by a first temperature, a build period following the addition period and characterized by a second temperature greater than the first temperature, and a temperature ramp period between the addition period and the build period; wherein the temperature ramp period comprises increasing the temperature at an average rate of about 0.01 to about 0.35° C. per minute. In some embodiments, the temperature ramp period comprises increasing the temperature at an average rate of about 0.1 to about 0.3° C. per minute, specifically about 0.15 to about 0.25° C. per minute. At average rates of temperature change below about 0.01° C. per minute, the rate of temperature change becomes impractically slow, and the reactor equipment is inefficiently utilized. At average rates above about 0.35° C. per minute, the efficiency of incorporating hydroxyaryl-terminated polysiloxane into the block copolymer is undesirably decreased. In some embodiments, the rate of temperature increase during the temperature ramp period is constant. In other embodiments, the rate of temperature increase during the temperature ramp period is variable, including embodiments in which the rate of temperature rate increase is discontinuous. The average rate of temperature increase is calculated as the net rate of temperature increase between the addition phase and the build phase.

The method comprises oxidatively copolymerizing a monohydric phenol and a hydroxyaryl-terminated polysiloxane. The hydroxyaryl-terminated polysiloxane can be added to the reaction vessel any time before initiation of the temperature ramp period. For example, the hydroxyaryl-terminated polysiloxane can be present in the reaction vessel before initiation of the monohydric phenol addition period, or the hydroxyaryl-terminated polysiloxane can be added to the reaction vessel during the monohydric phenol addition period, or the hydroxyaryl-terminated polysiloxane can be added to the reaction after the monohydric phenol addition period and before the temperature ramp period. In some embodiments, the oxidative copolymerization is initiated in the presence of less than 50 weight percent of the total hydroxyaryl-terminated polysiloxane used, specifically 0 to less than 50 weight percent of the total hydroxyaryl-terminated polysiloxane used, more specifically 0 to about 45 weight percent of the total hydroxyaryl-terminated polysiloxane used, even more specifically about 5 to about 40 weight percent of the total hydroxyaryl-terminated polysiloxane used. In some embodiments, the oxidative copolymerization is initiated in the presence of less than 50 weight percent of the total monohydric phenol used, specifically about 1 to less than 50 weight percent of the total monohydric phenol used, more specifically about 2 to about 20 weight percent of the total monohydric phenol used. In such embodiments, addition of the remaining monohydric phenol can occur before the temperature ramp period (i.e., during the monohydric phenol addition period) and at the first temperature.

In the method, oxidatively polymerizing the monohydric phenol and the hydroxyaryl-terminated polysiloxane comprises a monohydric phenol addition period characterized by a first temperature, and a build period following the addition period and characterized by a second temperature greater than the first temperature. In some embodiments, the first temperature is about 20 to about 60° C., and the second temperature is about 30 to about 70° C. Within the range of about 20 to about 60° C., the first temperature can be about 25 to about 55° C., specifically about 30 to about 50° C., more specifically about 35 to about 45° C. Within the range of about 30 to about 70° C., the second temperature can be about 35 to about 65° C., specifically about 40 to about 60° C., more specifically about 45 to about 55° C. In some embodiments, the second temperature is greater than the first temperature by about 5 to about 30° C., specifically about 8 to about 25° C., more specifically about 10 to about 20° C.

In some embodiments, the oxidative copolymerization is conducted with a reaction time greater than or equal to 110 minutes, specifically 110 to about 300 minutes, more specifically about 140 to about 250 minutes, even more specifically about 170 to about 220 minutes. The reaction time is the elapsed time between initiation and termination of oxygen flow. Although, for brevity, the description herein repeatedly refers to "oxygen" or "oxygen flow", it will be understood that any oxygen containing gas, including air, can be used as the oxygen source.

The build period can be characterized by a build time, which is a subset of the reaction time and is the time between completion of the temperature ramp period and termination of oxygen flow. In some embodiments, the build time is about 30 to about 240 minutes, specifically about 60 to about 210 minutes, more specifically about 90 to about 180 minutes.

In some embodiments, the hydroxyaryl-terminated polysiloxane comprises, on average, about 20 to about 80 siloxane repeating units, specifically about 25 to about 70 siloxane repeating units, more specifically about 30 to about 60 siloxane repeating units, still more specifically about 35 to about 50 siloxane repeating units, yet more specifically about 40 to about 50 siloxane repeating units. The number of siloxane repeating units in the polysiloxane block is essentially unaffected by the copolymerization and isolation conditions, and it is therefore equivalent to the number of siloxane repeating units in the hydroxyaryl-terminated polysiloxane starting material. When not otherwise known, the average number of siloxane repeating units per hydroxylaryl-terminate polysiloxane molecule can be determined by NMR methods that compare the intensity of signals associated with the siloxane repeating units to those associated with the hydroxyaryl terminal groups. For example, when the hydroxyaryl-terminated polysiloxane is a eugenol-capped polydimethylsiloxane, it is possible to determine the average number of siloxane repeating units by a proton nuclear magnetic resonance ($^1$H NMR) method in which integrals for the protons of the dimethylsiloxane resonance and the protons of the eugenol methoxy group are compared.

In some embodiments, the hydroxyaryl-terminated polysiloxane constitutes greater than 8 to about 30 weight percent of the combined weight of the monohydric phenol and the hydroxyaryl-terminated polysiloxane. Within this range, the weight percent of the hydroxyaryl-terminated polysiloxane can be at least about 10 weight percent, specifically at least about 15 weight percent, more specifically at least about 20 weight percent, even more specifically at least about 22 weight percent, yet more specifically at least about 25 weight percent. Also within this range, the weight percent of the hydroxyaryl-terminated polysiloxane can be up to about 28 weight percent, specifically up to about 26 weight percent, even more specifically up to about 24 weight percent, yet more specifically up to about 22 weight percent.

An important benefit of the method is that it increases the efficiency of incorporation of the hydroxyaryl-terminated polysiloxane into the poly(arylene ether)-polysiloxane block copolymer, particularly when the hydroxyaryl-terminated polysiloxane constitutes greater than 8 weight percent of the combined weight of the monohydric phenol and the hydroxyaryl-terminated polysiloxane. For example, in some embodiments, the thermoplastic composition incorporates greater than 80 or greater than 85 or greater than 90 or greater than 95 weight percent of the hydroxyaryl-terminated polysiloxane into the poly(arylene ether)-polysiloxane block copolymer. In contrast, in the working examples of Carrillo US 2009/0318635 A1 utilizing a hydroxyaryl-terminated polysiloxane loading greater than 8 weight percent, incorporation efficiencies of less than or equal to 72 percent were observed. The method of calculating polysiloxane incorporation efficiency is described in the working examples below.

The thermoplastic composition comprises a poly(arylene ether). The poly(arylene ether) is the product of polymerizing the monohydric phenol alone and is a by-product of the block copolymer synthesis. When the monohydric phenol consists of a single compound (for example, 2,6-dimethylphenol), the poly(arylene ether) is the product of homopolymerizing that single monohydric phenol. When the monohydric phenol comprises two or more distinct monohydric phenol species (for example, a mixture of 2,6-dimethylphenol and 2,3,6-trimethylphenol), the poly(arylene ether) is the product of copolymerizing the two or more distinct monohydric phenol species.

In addition to the poly(arylene ether), the thermoplastic composition comprises a poly(arylene ether)-polysiloxane block copolymer. The poly(arylene ether)-polysiloxane block copolymer comprises a poly(arylene ether) block and a polysiloxane block. The poly(arylene ether) block is a residue of the polymerization of the monohydric phenol. In some embodiments, the poly(arylene ether) block comprises arylene ether repeating units having the structure

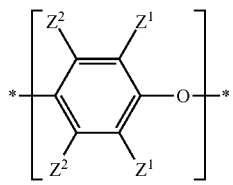

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom. In some embodiments, the poly(arylene ether) block comprises 2,6-dimethyl-1,4-phenylene ether repeating units, that is, repeating units having the structure

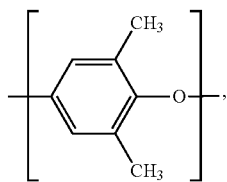

2,3,6-trimethyl-1,4-phenylene ether repeating units, or a combination thereof.

The polysiloxane block is a residue of the hydroxyaryl-terminated polysiloxane. In some embodiments, the polysiloxane block comprises repeating units having the structure

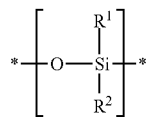

wherein each occurrence of $R^1$ and $R^2$ is independently hydrogen, $C_1$-$C_{12}$ hydrocarbyl or $C_1$-$C_{12}$ halohydrocarbyl; and the polysiloxane block further comprises a terminal unit having the structure

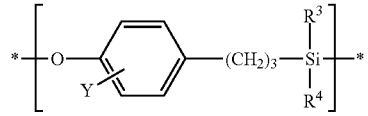

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl. In some embodiments, the polysiloxane repeating units comprise dimethylsiloxane (—Si(CH$_3$)$_2$O—) units. In some embodiments, the polysiloxane block has the structure

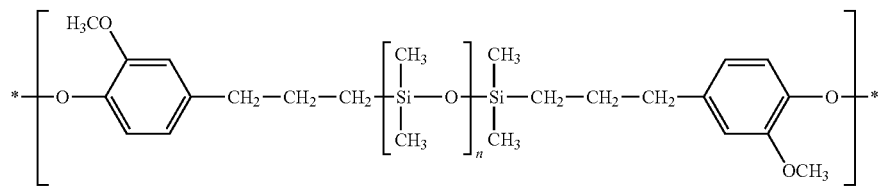

wherein n is 20 to 60.

The hydroxyaryl-terminated polysiloxane comprises at least one hydroxyaryl terminal group. In some embodiments, the hydroxyaryl-terminated polysiloxane has a single hydroxyaryl terminal group, in which case a poly(arylene ether)-polysiloxane diblock copolymer is formed. In other embodiments, the hydroxyaryl-terminated polysiloxane has two hydroxyaryl terminal groups, in which case in which case poly(arylene ether)-polysiloxane diblock copolymers and/or poly(arylene ether)-polysiloxane-poly(arylene ether) triblock copolymers are formed. It is also possible for the hydroxyaryl-terminated polysiloxane to have a branched structure that allows three or more hydroxyaryl terminal groups and the formation of corresponding branched copolymers.

In some embodiments, the thermoplastic composition has a weight average molecular weight of at least 30,000 atomic mass units. For example, the thermoplastic composition can have a weight average molecular weight of 30,000 to about 150,000 atomic mass units, specifically about 35,000 to about 120,000 atomic mass units, more specifically about 40,000 to about 90,000 atomic mass units, even more specifically about 45,000 to about 70,000 atomic mass units.

In some embodiments, the thermoplastic composition comprises greater than 8 to about 30 weight percent siloxane repeating units and about 70 to less than 92 weight percent arylene ether repeating units, based on the total weight of the poly(arylene ether) and the poly(arylene ether)-polysiloxane block copolymer. Within the range of greater than 8 to about 30 weight percent, the weight percent siloxane repeating units can be about 10 to about 27 weight percent, specifically about 12 to about 24 weight percent, more specifically about 14 to about 22 weight percent, even more specifically about 16 to about 20 weight percent. Within the range of about 70 to less than 92 weight percent, the weight percent arylene ether repeating units can be about 74 to about 90 weight percent, specifically about 77 to about 88 weight percent, more specifically about 78 to about 86 weight percent, yet more specifically about 80 to about 84 weight percent. It will be understood that the siloxane repeating units are derived from the hydroxyaryl-terminated polysiloxane, and the arylene ether repeating units are derived from the monohydric phenol. In some embodiments, such as, for example, when the thermoplastic composition is purified via precipitation in isopropanol, the siloxane repeating units consist essentially of the residue of hydroxyaryl-terminated polysiloxane that has been incorporated into the poly(arylene ether)-polysiloxane block copolymer. In some embodiments, the thermoplastic composition comprises 15 to about 25 weight percent siloxane repeating units and about 75 to 85 weight percent arylene ether repeating units. Within the range of 15 to about 25 weight percent siloxane repeating units, the weight percent siloxane repeating units can be about 16 to about 24 weight percent, specifically about 17 to about 22 weight percent, more specifically about 18 to about 20 weight percent. Within the range of about 75 to 85 weight percent, the weight percent arylene ether repeating units can be about 76 to about 84 weight percent, specifically about 78 to about 83 weight percent, more specifically about 80 to about 82 weight percent.

In a very specific embodiment of the method, the monohydric phenol is 2,6-dimethylphenol; the hydroxyaryl-terminated polysiloxane is a eugenol-capped polydimethylsiloxane comprising about 20 to about 60 dimethylsiloxane units; the oxidative copolymerization is conducted with a reaction time of 170 to 220 minutes; the temperature ramp period comprises increasing the temperature at an average rate of about 0.1 to about 0.3° C. per minute, specifically about 0.15 to about 0.25° C. per minute; the hydroxyaryl-terminated polysiloxane constitutes about 10 to about 28 weight percent, specifically about 14 to about 26 weight percent, more specifically about 18 to about 24 weight percent of the combined weight of the monohydric phenol and the hydroxyaryl-terminated polysiloxane; the thermoplastic composition incorporates greater than 85 weight percent of the hydroxyaryl-terminated polysiloxane into the poly(arylene ether)-polysiloxane block copolymer; the thermoplastic composition comprises 15 to about 25 weight percent, specifically about 16 to about 24 weight percent, more specifically about 17 to about 22 weight percent, even more specifically about 18 to about 20 weight percent siloxane repeating units and about 75 to 85 weight percent, specifically about 76 to about 84 weight percent, more specifically about 78 to about 83 weight percent, even more specifically about 80 to about 82 weight percent arylene ether repeating units, based on the total weight of the poly(arylene ether) and the poly(arylene ether)-polysiloxane block copolymer; and the thermoplastic composition has a weight average molecular weight of 30,000 to 150,000 atomic mass units.

Other embodiments include thermoplastic compositions prepared by any of the above-described methods.

In some embodiments, the thermoplastic composition comprises greater than 8 to about 30 weight percent siloxane repeating units and about 70 to less than 92 weight percent arylene ether repeating units, based on the total weight of the poly(arylene ether) and the poly(arylene ether)-polysiloxane block copolymer. Within the range of greater than 8 to about 30 weight percent, the weight percent siloxane repeating units can be about 10 to about 27 weight percent, specifically about 12 to about 24 weight percent, more specifically about 14 to about 22 weight percent, even more specifically about 16 to about 20 weight percent. Within the range of about 70 to less than 92 weight percent, the weight percent arylene ether repeating units can be about 74 to about 90 weight percent, specifically about 76 to about 88 weight percent, more specifically about 78 to about 86 weight percent, yet more specifically about 80 to about 84 weight percent. In some embodiments, the thermoplastic composition comprises 15 to about 25 weight percent siloxane repeating units and about 75 to 85 weight percent arylene ether repeating units, based on the total weight of the poly(arylene ether) and the poly(arylene ether)-polysiloxane block copolymer. Within the range of 15 to about 25 weight percent siloxane repeating units, the weight percent siloxane repeating units can be about 16 to about 24 weight percent, specifically about 17 to about 22 weight percent, more specifically about 18 to about 20 weight percent. Within the range of about 75 to 85 weight percent, the weight percent arylene ether repeating units can be about 76 to about 84 weight percent, specifically about 78 to about 83 weight percent, more specifically about 80 to about 82 weight percent.

In some embodiments, the hydroxyaryl-terminated polysiloxane comprises, on average, about 35 to about 80 siloxane repeating units, specifically about 40 to about 70 siloxane repeating units, more specifically about 40 to about 60 repeating units, even more specifically about 40 to about 50 siloxane repeating units.

In some embodiments, the thermoplastic composition has a weight average molecular weight of at least 30,000 atomic mass units. The weight average molecular weight can be 30,000 to about 150,000 atomic mass units, specifically about 35,000 to about 120,000 atomic mass units, more specifically about 40,000 to about 90,000 atomic mass units, even more specifically about 45,000 to about 70,000 atomic mass units.

In a very specific embodiment of the thermoplastic composition prepared by the above-described methods, the monohydric phenol is 2,6-dimethylphenol; the hydroxyaryl-terminated polysiloxane is a eugenol-capped polydimethylsiloxane comprising 35 to 60 dimethylsiloxane units; the thermoplastic composition comprises 15 to about 25 weight percent, specifically about 16 to about 24 weight percent, more specifically about 17 to about 22 weight percent, even more specifically about 18 to about 20 weight percent siloxane repeating units, and about 75 to 85 weight percent, specifically about 76 to about 84 weight percent, more specifically about 78 to about 83 weight percent, even more specifically about 80 to about 82 weight percent arylene ether repeating units; and the thermoplastic composition has a weight average molecular weight of 30,000 to 150,000 atomic mass units.

Another embodiment is a thermoplastic composition. Specifically, the thermoplastic composition comprises a poly(arylene ether); and a poly(arylene ether)-polysiloxane block copolymer comprising a poly(arylene ether) block, and a polysiloxane block comprising, on average, about 20 to about 80 siloxane repeating units, specifically about 25 to about 70 siloxane repeating units, more specifically about 30 to about 60 siloxane repeating units, even more specifically about 35 to about 50 siloxane repeating units, still more specifically about 40 to about 50 siloxane repeating units; wherein the thermoplastic composition comprises greater than 8 to about 30 weight percent, specifically about 10 to about 27 weight percent, more specifically about 12 to about 24 weight percent, even more specifically about 14 to about 22 weight percent, yet more specifically about 16 to about 20 weight percent siloxane repeating units, and about 70 to less than 92 weight percent, specifically about 74 to about 90 weight percent, more specifically about 77 to about 88 weight percent, even more specifically about 78 to about 86 weight percent, yet more specifically about 84 to about 80 weight percent arylene ether repeating units, based on the total weight of the poly(arylene ether) and the poly(arylene ether)-polysiloxane block copolymer; wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of at least 30,000 atomic mass units, specifically about 30,000 to about 150,000 atomic mass units, more specifically about 35,000 to about 120,000 atomic mass units, still more specifically about 40,000 to about 90,000 atomic mass units, yet more specifically about 45,000 to about 70,000 atomic mass units.

In some embodiments, the thermoplastic composition comprises 15 to about 25 weight percent siloxane repeating units and about 75 to 85 weight percent arylene ether repeating units. Within the range of 15 to about 25 weight percent siloxane repeating units, the weight percent of siloxane repeating units can be about 16 to about 24 weight percent, specifically about 17 to about 22 weight percent, even more specifically about 18 to about 20 weight percent. Within the range of about 75 to 85 weight percent, the weight percent of arylene ether repeating units can be about 76 to about 84 weight percent, specifically about 78 to about 83 weight percent, more specifically about 80 to about 82 weight percent. These repeating unit amounts are particularly applicable to thermoplastic composition after precipitation from isopropanol, which substantially removes free hydroxyaryl-terminated polysiloxane. The thermoplastic composition is distinguished from the thermoplastic compositions of Carrillo US 2009/0318635 A1, none of which comprises more than 14 weight percent siloxane units.

In some embodiments, the thermoplastic composition has a weight average molecular weight of about 35,000 to about 150,000 atomic mass units.

In some embodiments, the thermoplastic composition has an intrinsic viscosity of at least 0.3 as measured at 25° C. in chloroform. In some embodiments, the intrinsic viscosity is 0.3 to about 0.5, specifically 0.31 to about 0.5, more specifically about 0.35 to about 0.47. In any of the embodiments described in this paragraph, the thermoplastic composition can, optionally, comprise 15 to about 25 weight percent siloxane repeating units.

In some embodiments, the thermoplastic composition comprises less than 20 weight percent, specifically less than 18 weight percent, more specifically less than 16 weight percent, even more specifically less than 14 weight percent, of molecules having a molecular weight less than 10,000 atomic mass units. In some embodiments, the molecules having a molecular weight less than 10,000 atomic mass units comprise, on average, about 10 to about 18 weight percent, specifically about 12 to about 16 weight percent, siloxane repeating units. In some embodiments, the thermoplastic composition comprises less than 26 weight percent, specifically less than 24 weight percent, more specifically less than 22 weight percent, even more specifically less than 20 weight percent, of molecules having a molecular weight greater than 100,000 atomic mass units. In some embodiments, the molecules having a molecular weight greater than 100,000 atomic mass units comprise, on average, about 17 to about 25 weight percent, specifically about 19 to about 23 weight percent, siloxane repeating units. The limitations in this paragraph can apply when the thermoplastic composition has been isolated by precipitation from isopropanol.

In some embodiments of the thermoplastic composition, it comprises less than 20 weight percent, specifically less than 18 weight percent, more specifically less than 16 weight percent, even more specifically less than 14 weight percent, of molecules having a molecular weight less than 10,000 atomic mass units; and the thermoplastic composition comprises less than 26 weight percent, specifically less than 24 weight percent, more specifically less than 22 weight percent, even more specifically less than 20 weight percent, of molecules having a molecular weight greater than 100,000 atomic mass units.

In some embodiments of the thermoplastic composition, the molecules having a molecular weight less than 10,000 atomic mass units comprise, on average, about 10 to about 18 weight percent, specifically about 12 to about 16 weight percent, siloxane repeating units; and the molecules having a molecular weight greater than 100,000 atomic mass units comprise, on average, about 17 to about 25 weight percent siloxane repeating units.

In some embodiments of the thermoplastic composition, the hydroxyaryl-terminated polysiloxane comprises 35 to about 60 siloxane repeating units, specifically about 40 to about 50 siloxane repeating units. When the hydroxyaryl-terminated polysiloxane is a eugenol-capped polydimethylsiloxane, it is possible to determine the average number of siloxane repeating units by a $^1$H NMR method in which integrals for the protons of the dimethylsiloxane resonance and the protons of the eugenol methoxy group are compared. The hydroxyaryl-terminated polysiloxane comprises at least one hydroxyaryl terminal group. In some embodiments, the hydroxyaryl-terminated polysiloxane has a single hydroxyaryl terminal group, in which case a poly(arylene ether)-polysiloxane diblock copolymer is formed. In other embodiments, the hydroxyaryl-terminated polysiloxane has two hydroxyaryl terminal groups, in which case poly(arylene ether)-polysiloxane diblock and/or triblock copolymers are formed. It is also possible for the hydroxyaryl-terminated polysiloxane to have a branched structure that allows three or more hydroxyaryl terminal groups.

In a specific embodiment of the thermoplastic composition, the monohydric phenol consists of 2,6-dimethylphenol, and the thermoplastic composition comprises less than or equal to 0.4 weight percent, and more specifically 0.1 to 0.4 weight percent, of 2,6-dimethylphenoxy tail end groups. The 2,6-dimethylphenoxy tail end groups are characteristic of poly(2,6-dimethyl-1,4-phenylene ether) homopolymer with a head-to-tail (hydroxy-monoterminated) structure in which the linear product molecule is terminated on one end by a 3,5-dimethyl-4-hydroxyphenyl "head" and on the other end by a 2,6-dimethylphenoxy "tail". So, the low concentration of 2,6-dimethylphenoxy tail end groups is an indication that the thermoplastic composition comprises a reduced concentration of such monofunctional homopolymer and an increased concentration of the desired poly(arylene ether)-polysiloxane block copolymer. In some embodiments, the monohydric phenol consists of 2,6-dimethylphenol, and the thermoplastic composition comprises 0.1 to 2.0 weight percent of 2,6-dimethyl-4-(3,5-dimethyl-4-hydroxyphenyl)-phenoxy groups.

The thermoplastic composition can further include groups derived from a diphenoquinone, which is itself an oxidation product of the monohydric phenol. For example, when the monohydric phenol is 2,6-dimethylphenol, the diphenoquinone is 3,3',5,5'-tetramethyl-4,4'-diphenoquinone. During the build phase of the reaction, the diphenoquinone is typically incorporated into the "tail" end of a head-to-tail poly(arylene ether) as the corresponding biphenyl group. Through further reactions, the terminal biphenyl group can become an internal biphenyl group in the poly(arylene ether) chain. In some embodiments, the monohydric phenol consists of 2,6-dimethylphenol, and the thermoplastic composition comprises 0.1 to 2.0 weight percent, and specifically 1.1 to 2.0 weight percent, of 2,6-dimethyl-4-(3,5-dimethyl-4-hydroxyphenyl)-phenoxy ("biphenyl") groups. The biphenyl groups are present only in bifunctional (head-to-head or hydroxy-diterminated) structure. So, the low concentration of biphenyl group is an indication that the thermoplastic composition comprises a reduced concentration of such bifunctional homopolymer and an increased concentration of the desired poly(arylene ether)-polysiloxane block copolymer.

The thermoplastic composition can be isolated from solution by an isolation procedure that minimizes volatile and nonvolatile contaminants. For example, in some embodiments, the thermoplastic composition comprises less than or equal to 1 weight percent of total volatiles, specifically 0.2 to 1 weight percent of total volatiles, determined according to the procedure in the working examples below.

In some embodiments, the monomer mixture is oxidatively copolymerized in the presence of a catalyst comprising a metal (such as copper or manganese), and the thermoplastic composition comprises less than or equal to 100 parts per million by weight of the metal, specifically 5 to 100 parts per million by weight of the metal, more specifically 10 to 50 parts per million by weight of the metal, even more specifically 20 to 50 parts by weight of the metal.

In some embodiments of the thermoplastic composition, the poly(arylene ether) block comprises arylene ether repeating units having the structure

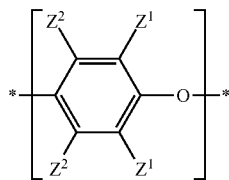

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom; the polysiloxane block comprises repeating units having the structure

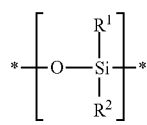

wherein each occurrence of $R^1$ and $R^2$ is independently hydrogen, $C_1$-$C_{12}$ hydrocarbyl or $C_1$-$C_{12}$ halohydrocarbyl; and the polysiloxane block further comprises a terminal unit having the structure

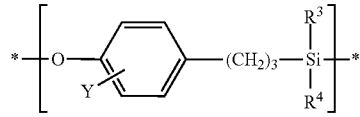

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl.

In some embodiments of the thermoplastic composition, the poly(arylene ether) block comprises arylene ether repeating units having the structure

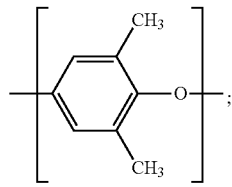

and
the polysiloxane block has the structure

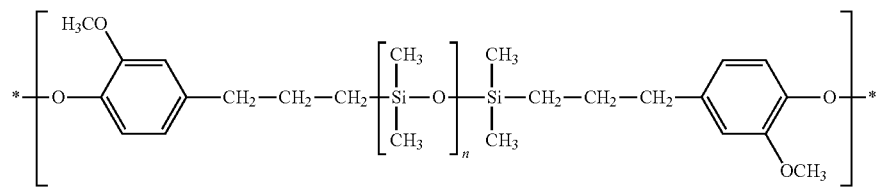

wherein n is 20 to 60; and the thermoplastic composition has a number average molecular weight of 10,000 to 30,000 atomic mass units.

Other embodiments include blends of the thermoplastic composition with other polymers. Such other polymers can include, for example, polystyrenes (including homopolystyrenes, rubber-modified polystyrenes, styrenic block copolymers, and hydrogenated styrenic block copolymers), polyamides (including, for example, polyamide-6 and polyamide-6,6), polyolefins (including, for example, polyethylenes, polypropylenes, polybutenes, and olefin copolymers), polyesters (including, for example, poly(ethylene terephthalate) and poly(butylenes terephthalate)), and combinations thereof. One embodiment is a polymer blend, comprising: about 5 to about 95 weight percent of a polymer selected from the group consisting of polystyrenes, polyamides, polyolefins, polyesters, and combinations thereof; and about 5 to about 95 weight percent of a thermoplastic composition; wherein the thermoplastic composition comprises a poly (arylene ether); and a poly(arylene ether)-polysiloxane block copolymer comprising a poly(arylene ether) block, and a polysiloxane block comprising, on average, about 20 to about 80 siloxane repeating units, specifically about 25 to about 70 siloxane repeating units, more specifically about 30 to about 60 siloxane repeating units, even more specifically about 35 to about 50 siloxane repeating units, still more specifically about 40 to about 50 siloxane repeating units; wherein the thermoplastic composition comprises greater than 8 to about 30 weight percent siloxane repeating units, specifically about 10 to about 27 weight percent siloxane repeating units, more specifically about 12 to about 24 weight percent siloxane repeating units, still more specifically about 14 to about 22 weight percent siloxane repeating units, even more specifically about 16 to about 20 weight percent siloxane repeating units, and about 70 to less than 92 weight percent arylene ether repeating units, specifically about 74 to about 90 weight percent arylene ether units, more specifically about 77 to about 88 weight percent arylene ether repeating units, even more specifically about 78 to about 86 weight percent arylene ether repeating units, yet more specifically about 80 to about 84 weight percent arylene ether repeating units, based on the total weight of the poly(arylene ether) and the poly(arylene ether)-polysiloxane block copolymer; wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of at least 30,000 atomic mass units, specifically 30,000 to about 150,000 atomic mass units, more specifically about 35,000 to about 120,000 atomic mass units, even more specifically about 40,000 to about 90,000 atomic mass units, yet more specifically about 45,000 to about 70,000 atomic mass units.

The invention includes at least the following embodiments.

Embodiment 1: A method of preparing a thermoplastic composition, comprising oxidatively copolymerizing a monohydric phenol and a hydroxyaryl-terminated polysiloxane; wherein said oxidatively polymerizing the monohydric phenol and the hydroxyaryl-terminated polysiloxane comprises a monohydric phenol addition period characterized by a first temperature, a build period following the addition period and characterized by a second temperature greater than the first temperature, and a temperature ramp period between the addition period and the build period; and wherein the temperature ramp period comprises increasing the temperature at an average rate of about 0.01 to about 0.35° C. per minute.

Embodiment 2: The method of embodiment 1, wherein the first temperature is about 20 to about 60° C., and the second temperature is about 30 to about 70° C.

Embodiment 3: The method of embodiment 1 or 2, wherein the oxidative copolymerization is conducted with a reaction time greater than or equal to 110 minutes.

Embodiment 4: The method of any of embodiments 1-3, wherein the reaction time comprises a build time of about 30 to about 240 minutes.

Embodiment 5: The method of any of embodiments 1-4, wherein the oxidative copolymerization is initiated in the presence of less than 50 weight percent of the total hydroxyaryl-terminated polysiloxane used.

Embodiment 6: The method of any of embodiments 1-5, wherein the oxidative copolymerization is initiated in the presence of less than 50 weight percent of the total monohydric phenol used.

Embodiment 7: The method of embodiment 6, wherein addition of remaining monohydric phenol occurs before the temperature ramp period and at the first temperature.

Embodiment 8: The method of any of embodiments 1-7, wherein the hydroxyaryl-terminated polysiloxane comprises, on average, about 20 to about 80 siloxane repeating units.

Embodiment 9: The method of any of embodiments 1-8, wherein the hydroxyaryl-terminated polysiloxane constitutes greater than 8 to about 30 weight percent of the combined weight of the monohydric phenol and the hydroxyaryl-terminated polysiloxane.

Embodiment 10: The method of any of embodiments 1-9, wherein the thermoplastic composition incorporates greater than 80 weight percent of the hydroxyaryl-terminated polysiloxane into the poly(arylene ether)-polysiloxane block copolymer.

Embodiment 11: The method of any of embodiments 1-10, wherein the thermoplastic composition has a weight average molecular weight of at least 30,000 atomic mass units.

Embodiment 12: The method of any of embodiments 1-11, wherein the thermoplastic composition comprises greater than 8 to about 30 weight percent siloxane repeating units and about 70 to less than 92 weight percent arylene ether repeating units.

Embodiment 13: The method of any of embodiments 1-12, wherein the thermoplastic composition comprises 15 to about 25 weight percent siloxane repeating units and about 75 to 85 weight percent arylene ether repeating units.

Embodiment 14: The method of embodiment 1, wherein the monohydric phenol is 2,6-dimethylphenol; wherein the hydroxyaryl-terminated polysiloxane is a eugenol-capped polydimethylsiloxane comprising about 20 to about 60 dimethylsiloxane units; wherein the oxidative copolymerization is conducted with a reaction time of 170 to 220 minutes; wherein the temperature ramp period comprises increasing the temperature at an average rate of about 0.1 to about 0.3° C. per minute; wherein the hydroxyaryl-terminated polysiloxane constitutes about 10 to about 28 weight percent of the combined weight of the monohydric phenol and the hydroxyaryl-terminated polysiloxane; wherein the thermoplastic composition incorporates greater than 85 weight percent of the hydroxyaryl-terminated polysiloxane into the poly (arylene ether)-polysiloxane block copolymer; wherein the thermoplastic composition comprises 15 to about 25 weight percent siloxane repeating units and about 75 to 85 weight percent arylene ether repeating units; and wherein the thermoplastic composition has a weight average molecular weight of 30,000 to 150,000 atomic mass units.

Embodiment 15: A thermoplastic composition prepared by the method of any of embodiments 1-14.

Embodiment 16: The thermoplastic composition of embodiment 15, wherein the composition comprises greater than 8 to about 30 weight percent siloxane repeating units and about 70 to less than 92 weight percent arylene ether repeating units.

Embodiment 17: The thermoplastic composition of embodiment 15 or 16, wherein the thermoplastic composition comprises 15 to about 25 weight percent siloxane repeating units and about 75 to 85 weight percent arylene ether repeating units.

Embodiment 18: The thermoplastic composition of any of embodiments 15-17, wherein the hydroxyaryl-terminated polysiloxane comprises, on average, about 35 to about 80 siloxane repeating units.

Embodiment 19: The thermoplastic composition of any of embodiments 15-18, wherein the thermoplastic composition has a weight average molecular weight of at least 30,000 atomic mass units.

Embodiment 20: The thermoplastic composition of embodiment 15, wherein the monohydric phenol is 2,6-dimethylphenol; wherein the hydroxyaryl-terminated polysiloxane is a eugenol-capped polydimethylsiloxane comprising 35 to 60 dimethylsiloxane units; wherein the thermoplastic composition comprises 15 to about 25 weight percent siloxane repeating units and about 75 to 85 weight percent arylene ether repeating units; and wherein the thermoplastic composition has a weight average molecular weight of 30,000 to 150,000 atomic mass units.

Embodiment 21: A thermoplastic composition, comprising: a poly(arylene ether); and a poly(arylene ether)-polysiloxane block copolymer comprising a poly(arylene ether) block, and a polysiloxane block comprising, on average, about 20 to about 80 siloxane repeating units; wherein the thermoplastic composition comprises greater than 8 to about 30 weight percent siloxane repeating units and about 70 to less than 92 weight percent arylene ether repeating units, based on the total weight of the poly(arylene ether) and the poly(arylene ether)-polysiloxane block copolymer; wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of at least 30,000 atomic mass units.

Embodiment 22: The thermoplastic composition of embodiment 21, wherein the thermoplastic composition comprises 15 to about 25 weight percent siloxane repeating units and about 75 to 85 weight percent arylene ether repeating units.

Embodiment 23: The thermoplastic composition of embodiment 21 or 22, wherein the thermoplastic composition has a weight average molecular weight of about 35,000 to about 150,000 atomic mass units.

Embodiment 24: The thermoplastic composition of any of embodiments 21-23, wherein the thermoplastic composition has an intrinsic viscosity of at least 0.3 as measured at 25° C. in chloroform.

Embodiment 25: The thermoplastic composition of any of embodiments 21-24, wherein the thermoplastic composition has an intrinsic viscosity of 0.3 to 0.6 deciliter per gram as measured at 25° C. in chloroform.

Embodiment 26: The thermoplastic composition of any of embodiments 21-25, wherein the thermoplastic composition comprises less than 20 weight percent of molecules having a molecular weight less than 10,000 atomic mass units.

Embodiment 27: The thermoplastic composition of any of embodiments 21-26, wherein the molecules having a molecular weight less than 10,000 atomic mass units comprise, on average, about 10 to about 18 weight percent siloxane repeating units.

Embodiment 28: The thermoplastic composition of any of embodiments 21-27, wherein the thermoplastic composition comprises less than 26 weight percent of molecules having a molecular weight greater than 100,000 atomic mass units.

Embodiment 29: The thermoplastic composition of any of embodiments 21-28, wherein the molecules having a molecular weight greater than 100,000 atomic mass units comprise, on average, about 17 to about 25 weight percent siloxane repeating units.

Embodiment 30: The thermoplastic composition of any of embodiments 21-29, wherein the thermoplastic composition comprises less than 20 weight percent of molecules having a molecular weight less than 10,000 atomic mass units; and wherein the thermoplastic composition comprises less than 26 weight percent of molecules having a molecular weight greater than 100,000 atomic mass units.

Embodiment 31: The thermoplastic composition of any of embodiments 21-30, wherein the molecules having a molecular weight less than 10,000 atomic mass units comprise, on average, about 10 to about 18 weight percent siloxane repeating units; wherein the molecules having a molecular weight greater than 100,000 atomic mass units comprise, on average, about 17 to about 25 weight percent siloxane repeating units.

Embodiment 32: The thermoplastic composition of any of embodiments 21-31, wherein the hydroxyaryl-terminated polysiloxane comprises 35 to about 60 siloxane repeating units.

Embodiment 33: The thermoplastic composition of any of embodiments 21-32, wherein the hydroxyaryl-terminated polysiloxane comprises about 40 to about 50 siloxane repeating units.

Embodiment 34: The thermoplastic composition of any of embodiments 21-33, wherein the monohydric phenol consists of 2,6-dimethylphenol, and wherein the thermoplastic composition comprises less than or equal to 0.4 weight percent of 2,6-dimethylphenoxy tail end groups.

Embodiment 35: The thermoplastic composition of any of embodiments 21-34, wherein the monohydric phenol consists of 2,6-dimethylphenol, and wherein the thermoplastic composition comprises 0.1 to 0.4 weight percent of 2,6-dimethylphenoxy tail end groups.

Embodiment 36: The thermoplastic composition of any of embodiments 21-35, wherein the monohydric phenol consists of 2,6-dimethylphenol, and wherein the thermoplastic composition comprises 0.1 to 2.0 weight percent of 2,6-dimethyl-4-(3,5-dimethyl-4-hydroxyphenyl)-phenoxy groups.

Embodiment 37: The thermoplastic composition of embodiment 21, wherein the poly(arylene ether) block comprises arylene ether repeating units having the structure

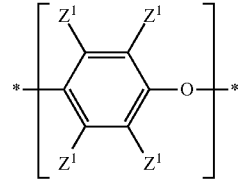

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom; wherein the polysiloxane block comprises repeating units having the structure

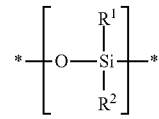

wherein each occurrence of $R^1$ and $R^2$ is independently hydrogen, $C_1$-$C_{12}$ hydrocarbyl or $C_1$-$C_{12}$ halohydrocarbyl; and wherein the polysiloxane block further comprises a terminal unit

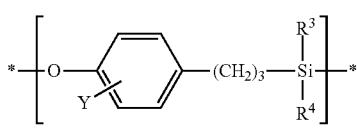

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl.

Embodiment 38: The thermoplastic composition of embodiment 21, wherein the poly(arylene ether) block comprises arylene ether repeating units having the structure

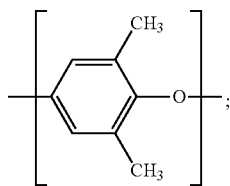

and
wherein the polysiloxane block has the structure

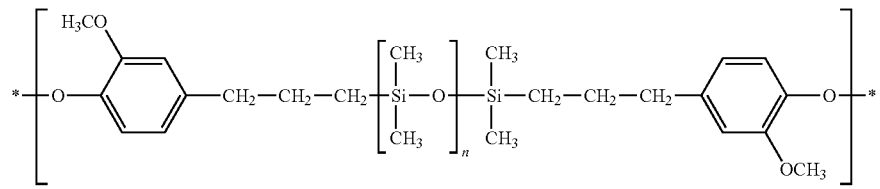

wherein n is 35 to 60; and wherein the thermoplastic composition has a number average molecular weight of 10,000 to 30,000 atomic mass units.

Embodiment 39: A polymer blend, comprising: about 5 to about 95 weight percent of a polymer selected from the group consisting of polystyrenes, polyamides, polyolefins, polyesters, and combinations thereof; and about 5 to about 95 weight percent of a thermoplastic composition, comprising a poly(arylene ether); and a poly(arylene ether)-polysiloxane block copolymer comprising a poly(arylene ether) block, and a polysiloxane block comprising, on average, about 20 to about 80 siloxane repeating units; wherein the thermoplastic composition comprises greater than 8 to about 30 weight percent siloxane repeating units and about 70 to less than 92 weight percent arylene ether repeating units, based on the total weight of the poly(arylene ether) and the poly(arylene ether)-polysiloxane block copolymer; wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of at least 30,000 atomic mass units.

The invention is further illustrated by the following non-limiting examples.

WORKING EXAMPLES

These examples illustrate the effects of several process variables on product characteristics. Comparative Examples 1-10 were produced in a 1.8 liter RC1 lab reactor. Examples 1-4 and Comparative Examples 11-14 were produced in a 190 liter pilot plant reactor.

The following materials were used in the synthesis of the poly(arylene ether)-polysiloxane block copolymers: 2,6-dimethylphenol was obtained from SABIC Innovative Plastics LLP; N,N-dimethyl-n-butylamine (DMBA), N,N'-di-tert-butyl-ethylenediamine (DBEDA), and di-n-butylamine (DBA) were obtained from Celanese Ltd.; cuprous oxide ($Cu_2O$) was obtained from American Chemet Corporation; a phase transfer agent was obtained as MAQUAT 4450T from Mason Chemical Company; hydrobromic acid (HBr) was obtained from Diaz Chemical Corporation; toluene was obtained from Ashland; trisodium nitrilotriacetate (NTA) was obtained from Akzo Nobel Functional Chemicals LLC; eugenol-capped polysiloxane fluids were obtained from Momentive Performance Materials.

Number average molecular weight and weight average molecular weight were determined by gel permeation chromatography as follows. The gel permeation chromatograph is calibrated using twelve polystyrene standards, each of narrow molecular weight distribution, and collectively spanning a molecular weight range of 1,000 to 1,000,000 grams/mole. The columns used were 1,000 and 100,000 angstrom PLgel columns with a 5 microliter 100 angstrom PLgel guard column. Chromatography was conducted at 25° C. The elution liquid was chloroform with 100 parts per million by weight di-n-butylamine. The elution flow was 1.5 milliliters per minute. The detector wavelength was 254 nanometers. A third degree polynomial function is fitted through the calibration points. Experimental samples are prepared by dissolving 0.01 gram of isolated solid thermoplastic composition in 20 milliliters chloroform. A 50 microliter sample of the resulting solution is injected into the chromatograph. The values of number average molecular weight ($M_n$) and weight average molecular weight ($M_w$) are calculated from the measured signal using the polystyrene calibration line. The values are subsequently converted from polystyrene molecular weight to poly(2,6-dimethyl-1,4-phenylene ether) molecular weights using the formula: $M(PPE)=0.3122 \times M(PS)^{1.073}$, where M(PPE) is poly(2,6-dimethyl-1,4-phenylene ether) molecular weight and M(PS) is polystyrene molecular weight.

The process variations are summarized in Tables 2 and 3, where "Toluene source" refers to whether the toluene solvent is fresh or recycled ("Recyc." or "Recycled" in Tables 2 and 3) from a poly(arylene ether) homopolymer synthesis; "DMBA level (%)" is the concentration of dimethyl-n-butylamine, expressed as a weight percent relative to the weight of toluene; "Solids (%)" is the weight of total 2,6-dimethylphenol and eugenol-capped polysiloxane, expressed as a weight percent relative to the sum of the weights of 2,6-dimethylphenol, eugenol-capped polysiloxane, and toluene; "Polysiloxane chain length" is the average number of dimethylsiloxane (—$Si(CH_3)_2O$—) units in the eugenol-capped polysiloxane; "Polysiloxane loading (%)" is the weight percent of eugenol-capped polysiloxane in the reaction mixture, based on the total weight of the eugenol-capped polysiloxane and the 2,6-dimethylphenol; "Initial 2,6-dimethylphenol (%)" is the weight percent of 2,6-dimethylphenol present in the reaction vessel at the initiation of polymerization (the introduction of oxygen to the reaction vessel), relative to the total weight of 2,6-dimethylphenol; "O:2,6-dimethylphenol mole ratio" is the mole ratio of atomic oxygen (provided as molecular oxygen) to 2,6-dimethylphenol maintained during the addition of 2,6-dimethylphenol; "Temp., initial charge (° C.)" is the temperature, in degrees centigrade, of the reaction mixture when the initial charge of monomer is added to the reaction vessel, and when oxygen is first introduced to the reaction mixture; "Temp., addition (° C.)" is the reaction temperature during further addition of 2,6-dimethylphenol; "Temp., build (° C.)" is the temperature, expressed in degrees centigrade, during the build phase of the reaction; "Ramp time (min)" is the time, expressed in minutes, during which the temperature was ramped from the addition temperature to the build temperature; "Ramp slope (° C./min)" is the rate of change of temperature, expressed in degrees centigrade per minute, during the period in which the temperature was ramped from the addition temperature to the build temperature; "Reaction time (min)" is the total reaction time, expressed in minutes, elapsed between the moment of oxygen introduction and the moment of oxygen cut-off. For all variations, controlled monomer addition time is 40 to 80 minutes from start of reaction (that is, the initiation of oxygen flow). Build time is measured from the end of the temperature ramp period to the end of reaction (that is, to the termination of oxygen flow); build time was varied between 30 and 110 minutes.

The properties of resulting products are also summarized in Tables 2 and 3. For the product properties in Tables 2 and 3, "Mol. Wt.<10K (%)" is the weight percent of the isolated product having a molecular weight less than 10,000 atomic mass units, as determined by gel permeation chromatography; "Mol. Wt.>100K (%)" is the weight percent of the isolated product having a molecular weight greater than 100,000 atomic mass units, as determined by gel permeation chromatography; "IV, end of rxn. (dL/g)" is the intrinsic viscosity, expressed in deciliters per gram and measured by Ubbelohde viscometer at 25° C. in chloroform, of dried powder isolated by precipitation from isopropanol (IPA); "IV, end of cheln. (dL/g)" is the intrinsic viscosity, expressed in deciliters per gram and measured by Ubbelohde viscometer at 25° C. in chloroform, of the product present in the post-chelation organic phase which has been isolated by precipitation from isopropanol then dried; "$M_w$, end of rxn. (AMU)" is the weight average molecular weight, expressed in atomic mass units and measured by gel permeation chromatography, of the product present in the reaction mixture at the end of the polymerization reaction which has been isolated by precipitation from isopropanol and then dried; "$M_n$, end of rxn. (AMU)" is the number average molecular weight, expressed in atomic mass units and measured by gel permeation chromatography, of the product present in the reaction mixture at the end of the polymerization reaction which has been isolated by precipitation from isopropanol and then dried; "$M_w/M_n$, end of rxn." is the ratio of weight average molecular weight to number average molecular weight for the product present in the reaction mixture at the end of the polymerization reaction which has been isolated by precipitation from isopropanol and then dried; "$M_w$, end of cheln. (AMU)" is the weight average molecular weight, expressed in atomic mass units and measured by gel permeation chromatography, of the product present in the post-chelation organic phase which has been isolated by precipitation from isopropanol and then dried; "$M_n$, end of cheln. (AMU)" is the number average molecular weight, expressed in atomic mass units and measured by gel permeation chromatography, of the product present in the post-chelation organic phase which has been isolated by precipitation from isopropanol and then dried; "$M_w/M_n$, end of cheln." is the ratio of weight average molecular weight to number average molecular weight for the product present in the post-chelation organic phase which has been isolated by precipitation from isopropanol and then dried.

In Tables 2 and 3, "Weight % siloxane (%)" is the weight percent of dimethylsiloxane units in the isolated product, based on the total weight of 2,6-dimethyl-1,4-phenylene ether units and dimethylsiloxane units in the isolated product, as determined by $^1$H NMR using protons labeled a and b in the structure labeled "Formula I", below, and calculated as $$\text{Weight \% Siloxane\_in\_product} = \frac{X}{X+Y} \times 100$$

where $$X = \frac{\text{Peak ``}b\text{'' Integral @ 0.6 ppm} \times \text{Mn Siloxane Fluid}}{\text{proton per } SiloxaneChain},$$

and $$Y = \frac{\text{Peak ``}a\text{'' Integral @ 6.47 ppm} \times \text{MW 2,6 xylenol}}{2}$$

where "Mn Siloxane Fluid" in the equation for X is the number average molecular weight of the dimethylsiloxane units in the hydroxyaryl-terminated polysiloxane, and "MW 2,6xylenol" in the equation for Y is the molecular weight of 2,6-dimethylphenol. Calling this metric "Weight % siloxane" is an oversimplification in that it neglects isolated product constituents other than the 2,6-dimethyl-1,4-phenylene ether units and dimethylsiloxane units. Nevertheless, it is a useful metric.

In Tables 2 and 3, "Siloxane Incorporation Efficiency (%)" is the weight percent of dimethylsiloxane units in the isolated product compared to the weight percent of dimethylsiloxane units in the total monomer composition used in the reaction mixture (the precipitation from isopropanol substantially removes unreacted (unincorporated) eugenol-capped polysiloxane and may also remove a small amount of very low molecular weight block copolymer), as determined by $^1$H NMR using protons labeled a and b in the structure labeled "Formula I", and calculated as $$\text{Siloxane\_Incorporation Efficiency\_(\%)} = \frac{\text{Weight \% Siloxane\_in\_product}}{\text{\% Siloxane Loaded}} \times 100$$

where the equation for Weight % Siloxane_in_product is given above, and $$\text{\% Siloxane Loaded} = \frac{\text{Weight of Siloxane Monomer Loaded}}{\text{Weight of Siloxane Monomer Loaded + Weight of 2,6 Monomer Loaded}} \times 100$$

where "Weight of Siloxane Monomer Loaded" is the weight of hydroxyaryl-terminated polysiloxane used in the reaction mixture, and "Weight of 2,6Monomer Loaded" is the total weight of 2,6-dimethylphenol used in the reaction mixture. Calling this metric "Siloxane Incorporation Efficiency" is an oversimplification in that it neglects the possibility that small amounts of monomers and oligomers may be lost in the isolation process. For example, it is theoretically possible for the Siloxane Incorporation Efficiency to exceed 100% if all of the hydroxyaryl-terminated polysiloxane is incorporated into the poly(arylene ether)-polysiloxane block copolymer, and some arylene ether oligomers are lost in the isolation procedure. Nevertheless, Siloxane Incorporation Efficiency is a useful metric.

In Tables 2 and 3, "Tail (%)" refers to the percent of 2,6-dimethylphenol that are in an end group configuration compared to total 2,6-dimethylphenol residues and is determined by $^1$H NMR using the "tail" protons labeled e in the structure labeled "Formula (III)" below, and the protons labeled a in the structure labeled "Formula (I)" below, and calculated as $$\% \text{ Tail} = \frac{Z}{Z+Y} \times 100$$

where the equation for Y is above, and $$Z = \frac{\text{Peak "}e\text{" Integral @ 7.09 ppm} \times \text{MW of 2,6 xylenol}}{3}$$

In Tables 2 and 3, "Biphenyl (%)" is the weight percent of 3,3',5,5'-tetramethyl-4,4'-biphenol residues, that is, residues having the structure

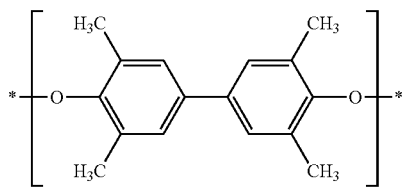

and is determined by $^1$H NMR using the "biphenyl" protons labeled d in the structure labeled "Formula (II)", below, and the protons labeled a in the structure labeled "Formula (I)", and calculated as $$\% \text{ Biphenyl} = \frac{W}{W+Y} \times 100$$

where the equation for Y is above, and $$W = \frac{\text{Peak "}d\text{" Integral @ 7.35 ppm} \times \text{MW biphenyl}}{4}$$

wherein "MW biphenyl" is the molecular weight of the residue of 3,3',5,5'-tetramethyl-4,4'-biphenol shown above.

"OH (ppm)" is the parts per million by weight of all hydroxyl groups, based on the total weight of the isolated sample, as determined by $^{31}$P NMR after phosphorus derivatization of the hydroxyl groups of the isolated sample as described in K. P. Chan et al., "Facile Quantitative Analysis of Hydroxyl End Groups of Poly(2,6-dimethyl-1,4-phenylene oxide)s by $^{31}$P NMR Spectroscopy", *Macromolecules*, volume 27, pages 6371-6375 (1994).

Formula (I):

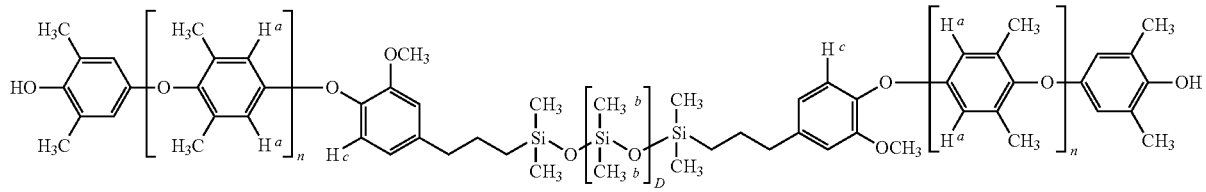

Formula (II):

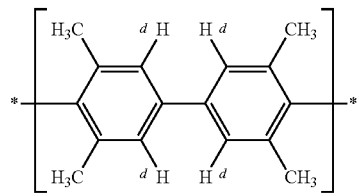

Formula (III):

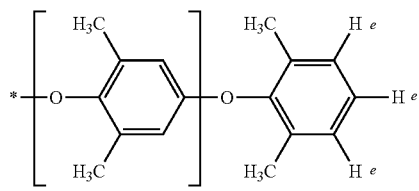

Comparative Examples 1-10

These examples, which were conducted in a 1.8 liter RC1 lab reactor, illustrate the effects of several process variables on the characteristics of the thermoplastic composition.

Component amounts for a representative reaction mixture are given in Table 1, where the flow rate units of standard cubic centimeters per minute are abbreviated "sccm", the agitator speed units of rotations per minute are abbreviated "rpm", and all amounts are expressed as percents are weight percents.

TABLE 1

| | Amount | Relative Amount |
|---|---|---|
| Toluene, initially present in reactor | 605 grams | |
| Eugenol-capped siloxane, initially present in reactor | Variable | See Tables 2 and 3. |
| 50% 2,6-dimethylphenol in toluene, added to reactor before initiation of $O_2$ flow | 47 grams | 7.9% of total 2,6-dimethylphenol |
| 50% 2,6-dimethylphenol in toluene, gradually added to reactor after initiation of $O_2$ flow | 553 grams | 92.1% of total 2,6-dimethylphenol |
| DBA, added to reactor before initiation of $O_2$ flow | 3.00 grams | 1% based on total monomer |
| DMBA, added to reactor before initiation of $O_2$ flow | 10.05 grams | 1% based on total toluene |
| Diamine Mix initially present in reactor | 0.474 grams DBEDA | 21% based on copper solution |
| | 0.0237 grams Maquat | 1.05% based on copper solution |
| | 0.869 grams toluene | 38.6% based on copper solution |
| Copper solution initially present in reactor | 0.16 grams $Cu_2O$ | 0.75% based on total monomer |
| | 2.09 grams 48% HBr (aq.) | 92.7% of total copper solution |
| Toluene rinse (hand-feed) | 100 grams | |
| Rate of monomer addition | 20 grams/minute | |
| $N_2$ Flow | 1200 sccm | |
| $O_2$ Flow | 700 sccm | |
| Agitator speed | 1000 rpm | |
| NTA/100 mL water | 1.78 grams | 1.2 mole NTA per mole Cu |

The process variations summarized in Table 2 were superimposed on the following general synthetic procedure for the RC1 reactor. The reactor was purged with nitrogen ($N_2$) via the dip tube later used for oxygen introduction. There is also a separate nitrogen inlet to adjust the nitrogen content in the reactor. An addition pot was loaded with a 50 weight percent solution of 2,6-dimethylphenol in toluene, and the headspace of the addition funnel was purged with nitrogen. The temperatures of the addition pot and its contents were adjusted to 50° C. using an ethylene glycol bath. The reactor was washed with 60° C. toluene while the nitrogen purge of the reactor was continued. The reactor was charged with initial toluene, polymerization catalyst, and eugenol-capped polydimethylsiloxane via a side port. Monomer addition and oxygen addition were started and the temperature was maintained at the value shown in the Table 2 row labeled "Temp., addition (° C.)". Starting after complete addition of 2,6-dimethylphenol, the temperature of the reaction vessel was gradually raised to the value shown in the Table 2 row labeled "Temp., build (° C.)". This temperature adjustment occurred over the time span indicated in the Table 2 row labeled "Ramp time (min)" and at the rate indicated in the Table 2 row labeled "Ramp slope (° C./min)". During the temperature adjustment phase and the constant temperature phase that followed, the oxygen flow was adjusted (typically, reduced) as necessary to maintain a headspace oxygen concentration of 18%. The reaction was continued until a desired time point was reached. This time point is predetermined with other experiments and is intended to ensure maximum siloxane incorporation and target intrinsic viscosity and is generally 80 to 160 minutes after complete addition of 2,6-dimethylphenol. Once this time point was reached, the oxygen flow was stopped. The reaction mixture and headspace are then purged with nitrogen. The total reaction time is the time elapsed between initiation and termination of oxygen flow. The reaction mixture is transferred to a glass vessel for chelation and separation of the polymerization catalyst. The chelation step utilizes 1.2 moles of trisodium nitrilotriacetate per mole of copper ion, where the trisodium nitrilotriacetate is provided as a 40 weight percent solution in water. The combined reaction mixture and chelant solution were stirred and maintained at 60° C. for one hour. The mixture is then phase separated using a separatory funnel or a liquid/liquid centrifuge to yield a heavy (aqueous) fraction that was discarded and a light (organic) fraction containing the block copolymer product. Use of the chelant solution typically results in a product having a residual catalyst metal concentration of 1 to 50 parts per million by weight, specifically 1 to 20 parts by million by weight, based on the dry weight of the isolated powder. The product was isolated via precipitation with methanol or isopropanol in a weight ratio of polymer solution to alcohol of 1:2 to 1:3, followed by filtration and drying of the filtrate under partial vacuum with nitrogen bleed at 110° C. overnight. The final powder typically has a residual solvent (e.g., toluene) concentration of 50 parts per million by weight to 1 weight percent. For product analysis, all samples were precipitated with isopropanol, except for Comparative Example 1, which was precipitated with methanol.

TABLE 2

|  | C. Ex. 1 | C. Ex. 2 | C. Ex. 3 | C. Ex. 4 | C. Ex. 5 | C. Ex. 6 |
|---|---|---|---|---|---|---|
| REACTION CONDITIONS | | | | | | |
| Toluene source | Fresh | Fresh | Fresh | Fresh | Fresh | Fresh |
| DMBA level (%) | 1 | 1 | 1 | 2 | 1 | 1 |
| Solids (%) | 23 | 23 | 23 | 23 | 23 | 23 |
| Polysiloxane chain length | 45 | 45 | 45 | 45 | 45 | 10 |
| Polysiloxane loading (%) | 20 | 20 | 20 | 20 | 10 | 20 |
| Initial 2,6-DMP (%) | 100 | 7.9 | 7.9 | 7.9 | 7.9 | 7.9 |
| O:2,6-DMP mole ratio | NA | 0.98 | 0.98 | 0.98 | 0.98 | 0.98 |
| Catalyst (%) | 0.75 | 0.75 | 0.75 | 1.5 | 0.75 | 0.75 |
| Temp., initial charge (° C.) | 30 | 30 | 30 | 30 | 30 | 30 |
| Temp., addition (° C.) | 30 | 30 | 30 | 30 | 30 | 30 |
| Temp., build (° C.) | 49 | 49 | 49 | 49 | 49 | 49 |
| Ramp time (min) | 10 | 10 | 10 | 10 | 10 | 10 |
| Ramp slope (° C./min) | 1.9 | 1.9 | 1.9 | 1.9 | 1.9 | 1.9 |
| Reaction time (min) | 80 | 120 | 200 | 200 | 200 | 200 |
| FINAL PRODUCT PROPERTIES | | | | | | |
| Mol. Wt. <10K (%) | — | — | — | — | — | — |
| Mol. Wt. >100K (%) | — | — | — | — | — | — |
| IV, end of rxn. (dL/g) | — | — | — | — | — | — |
| IV, end of cheln. (dL/g) | 0.15 | 0.25 | 0.26 | 0.30 | 0.30 | 0.15 |
| $M_w$, end of rxn. (AMU) | — | — | — | — | — | — |
| $M_n$, end of rxn. (AMU) | — | — | — | — | — | — |
| $M_w/M_n$, end of rxn. | — | — | — | — | — | — |
| $M_w$, end of cheln. (AMU) | 21000 | 23000 | 25000 | 32000 | 34000 | 7900 |
| $M_n$, end of cheln. (AMU) | 9000 | 11000 | 11000 | 14000 | 14000 | 4600 |
| $M_w/M_n$, end of cheln. | 2.3 | 2.1 | 2.3 | 2.3 | 2.4 | 1.7 |
| Weight % siloxane (%) | 9 | 11 | 11.8 | 14 | 5.52 | 5.2 |
| Siloxane Incorporation Efficiency (%) | 45 | 55 | 59 | 70 | 55 | 26 |
| Tail (%) | — | — | — | — | — | — |
| Biphenyl (%) | — | — | — | — | — | — |
| OH (ppm) | — | — | — | — | — | — |

|  | C. Ex. 7 | C. Ex. 8 | C. Ex. 9 | C. Ex. 10 |
|---|---|---|---|---|
| REACTION CONDITIONS | | | | |
| Toluene source | Fresh | Recyc. | Recyc. | Recyc. |
| DMBA level (%) | 1 | 1.17 | 1.17 | 1.17 |
| Solids (%) | 23 | 23 | 23 | 23 |
| Polysiloxane chain length | 30 | 45 | 45 | 45 |
| Polysiloxane loading (%) | 20 | 5 | 5 | 5 |
| Initial 2,6-DMP (%) | 7.9 | 7.9 | 7.9 | 7.9 |
| O:2,6-DMP mole ratio | 0.98 | 0.98 | 0.98 | 0.98 |
| Catalyst (%) | 0.75 | 0.75 | 0.75 | 0.75 |
| Temp., initial charge (° C.) | 30 | 21 | 21 | 21 |
| Temp., addition (° C.) | 30 | 38 | 38 | 38 |
| Temp., build (° C.) | 49 | 49 | 49 | 49 |
| Ramp time (min) | 10 | 10 | 30 | 5 |
| Ramp slope (° C./min) | 1.9 | 1.1 | 0.37 | 2.2 |
| Reaction time (min) | 200 | 180 | 180 | 180 |
| FINAL PRODUCT PROPERTIES | | | | |
| Mol. Wt. <10K (%) | — | 21 | 13 | 11 |
| Mol. Wt. >100K (%) | — | 7 | 10 | 11 |
| IV, end of rxn. (dL/g) | — | 0.46 | 0.42 | 0.42 |
| IV, end of cheln. (dL/g) | 0.25 | 0.28 | 0.31 | 0.33 |
| $M_w$, end of rxn. (AMU) | — | 64000 | 58000 | 61000 |
| $M_n$, end of rxn. (AMU) | — | 24000 | 23000 | 23000 |
| $M_w/M_n$, end of rxn. | — | 2.7 | 2.5 | 2.7 |
| $M_w$, end of cheln. (AMU) | 31000 | 37000 | 44000 | 44000 |
| $M_n$, end of cheln. (AMU) | 15000 | 14000 | 17000 | 16000 |
| $M_w/M_n$, end of cheln. | 2.1 | 2.6 | 2.6 | 2.8 |
| Weight % siloxane (%) | 14.4 | 4.9 | 4.8 | 5 |
| Siloxane Incorporation Efficiency (%) | 72 | 98 | 96 | 100 |
| Tail (%) | — | — | — | — |
| Biphenyl (%) | — | 2.0 | 1.6 | 1.6 |
| OH (ppm) | — | — | — | — |

Examples 1-4 and Comparative Examples 11-14

These examples, which were conducted on a 190 liter pilot plant scale, illustrate the effects of several process variables on the characteristics of the thermoplastic composition. The process variations and the properties of resulting products are summarized in Table 3. The siloxane incorporation efficiency reported for Examples 1-4 was calculated based on a polysiloxane loading of 20 weight percent, while the siloxane incorporation efficiency reported for Comparative Examples 11-14 was calculated based on a polysiloxane loading of 5 weight percent. Explanations of the types of process variations and types of properties of the resulting products are given above.

The process variations were superimposed on the following general synthetic procedure for the pilot plant scale. The reactor and the 2,6-dimethylphenol addition tank were rinsed with warm toluene to assure their cleanliness. The reaction was purged with nitrogen to achieve an oxygen concentration of less than 1%. The reactor was charged with initial toluene (fresh or recycled), and this toluene was stirred at 500 rotations per minute (rpm). The temperature of the initial toluene was adjusted to the "initial charge" temperature specified in Table 3 and maintained at that temperature during addition of the initial charge of 2,6-dimethylphenol from the addition tank to the reaction vessel. After the addition of the initial charge of 2,6-dimethylphenol was complete, the reaction vessel was charged with the eugenol-capped polydimethylsiloxane, the di-n-butylamine, the dimethyl-n-butylamine, the N,N'-di-tert-butyl-ethylenediamine, and the copper catalyst. Oxygen flow and further monomer addition were initiated, and the oxygen flow was regulated to maintain a head space concentration less than 17%. During further monomer addition, cooling water supply temperature was adjusted to maintain the temperature specified as "Temp., addition (° C.)" in Table 3. After monomer addition was complete, the monomer addition line was flushed with toluene and the reaction temperature was increased to the temperature specified as "Temp., build (° C.)" in Table 3. This temperature adjustment was conducted over the time period specified as "Ramp time (min)", and at the rate specified as "Ramp slope (° C./min)" in Table 3. The reaction was continued until a pre-determined end point is reached. The pre-determined end point is the time at which target intrinsic viscosity and maximum siloxane incorporation are attained and is typically 80 to 160 minutes after 2,6-dimethylphenyl addition ends. This time period includes the ramp period and build period. Once the end point was reached, the oxygen flow was stopped. The reaction mixture was then heated to 60° C. and pumped to a chelation tank containing aqueous chelant solution. The resulting mixture was stirred and held at 60° C. for one hour. The light (organic) and heavy (aqueous) phases were separated by decantation, and the heavy phase was discarded. A small portion of the light phase was sampled and precipitated with isopropanol for analysis, and the remainder of the light phase was pumped to a precipitation tank and combined with methanol antisolvent in a weight ratio of 3 parts antisolvent to 1 part light phase. The precipitate was filtered to form a wet cake, which was reslurried three times with the same antisolvent and dried under nitrogen until a toluene concentration less than 1 weight percent was obtained.

TABLE 3

|  | Ex. 1 | Ex. 2 | Ex. 3 | Ex. 4 | C. Ex. 11 |
|---|---|---|---|---|---|
| REACTION CONDITIONS | | | | | |
| Toluene source | Recycled | Recycled | Recycled | Recycled | Recycled |
| DMBA level (%) | 1 | 1 | 2 | 1 | 2.4 |
| Solids (%) | 23 | 23 | 23 | 23 | 23 |
| Polysiloxane chain length | 45 | 45 | 45 | 45 | 45 |
| Polysiloxane loading (%) | 20 | 20 | 20 | 20 | 5 |
| Initial 2,6-DMP (%) | 7.9 | 7.9 | 7.9 | 7.9 | 7.9 |
| O:2,6-DMP mole ratio | 1 | 1 | 1 | 1 | 0.98 |
| Catalyst (%) | 0.75 | 0.75 | 0.75 | 0.75 | 0.9 |
| Temp., initial charge (° C.) | 21 | 21 | 21 | 21 | 21 |
| Temp., addition (° C.) | 39 | 39 | 39 | 39 | 38 |
| Temp., build (° C.) | 49 | 49 | 49 | 49 | 49 |
| Ramp time (min) | 50 | 50 | 50 | 50 | 30 |
| Ramp slope (° C./min) | 0.2 | 0.2 | 0.2 | 0.2 | 0.37 |
| Reaction time (min) | 200 | 200 | 200 | 200 | 200 |
| FINAL PRODUCT PROPERTIES | | | | | |
| Mol. Wt. <10K (%) | — | — | — | — | 13 |
| Mol. Wt. >100K (%) | — | — | — | — | 19 |
| IV, end of rxn. (dL/g) | — | — | — | — | 0.53 |
| IV, end of cheln. (dL/g) | 0.38 | 0.36 | 0.41 | 0.42 | 0.46 |
| $M_w$, end of rxn. (AMU) | — | — | — | — | 72000 |
| $M_n$, end of rxn. (AMU) | — | — | — | — | 27000 |
| $M_w/M_n$, end of rxn. | — | — | — | — | 2.7 |
| $M_w$, end of cheln. (AMU) | 60000 | 55000 | 52000 | 61000 | 67000 |
| $M_n$, end of cheln. (AMU) | 20000 | 19000 | 18000 | 16000 | 23000 |
| $M_w/M_n$, end of cheln. | 2.97 | 2.87 | 2.89 | 3.85 | 2.9 |
| Weight % siloxane (%) - IPA precipitation | 17.7 | 18.2 | 18.5 | 19.3 | 4.9 |
| Weight % siloxane (%) - MeOH precipitation | 20.4 | 20.9 | 20.4 | 21.9 | |
| Siloxane Incorporation Efficiency (%) | 88.5 | 91.0 | 92.5 | 88.1 | 98 |
| Tail (%) | 0.25 | 0.21 | 0.25 | 0.17 | — |
| Biphenyl (%) | 1.23 | 1.19 | 1.18 | 1.15 | 1.16 |
| External Mannich (%) | 0.65 | 0.64 | 0.72 | 0.70 | — |

TABLE 3-continued

| | | | | |
|---|---|---|---|---|
| Internal Mannich (%) | 0.00 | 0.00 | 0.13 | 0.15 | — |
| OH (ppm) | — | 1762 | — | — | — |

| | C Ex. 12 | C. Ex. 13 | C. Ex. 14 |
|---|---|---|---|
| REACTION CONDITIONS | | | |
| Toluene source | Recycled | Recycled | Recycled |
| DMBA level (%) | 1.2 | 1.2 | 2.4 |
| Solids (%) | 23 | 23 | 23 |
| Polysiloxane chain length | 45 | 45 | 45 |
| Polysiloxane loading (%) | 5 | 5 | 5 |
| Initial 2,6-DMP (%) | 7.9 | 7.9 | 7.9 |
| O:2,6-DMP mole ratio | 0.98 | 0.98 | 0.98 |
| Catalyst (%) | 0.75 | 0.75 | 0.75 |
| Temp., initial charge (° C.) | 21 | 21 | 21 |
| Temp., addition (° C.) | 38 | 38 | 38 |
| Temp., build (° C.) | 49 | 49 | 49 |
| Ramp time (min) | 30 | 30 | 30 |
| Ramp slope (° C./min) | 0.37 | 0.37 | 0.37 |
| Reaction time (min) | 200 | 200 | 200 |
| FINAL PRODUCT PROPERTIES | | | |
| Mol. Wt. <10K (%) | 11 | 13 | 12 |
| Mol. Wt. >100K (%) | 16 | 19 | 12 |
| IV, end of rxn. (dL/g) | 0.45 | 0.53 | 0.40 |
| IV, end of cheln. (dL/g) | 0.39 | 0.46 | 0.36 |
| $M_w$, end of rxn. (AMU) | 64000 | 72000 | 58000 |
| $M_n$, end of rxn. (AMU) | 23000 | 27000 | 24000 |
| $M_w/M_n$, end of rxn. | 2.8 | 2.7 | 2.4 |
| $M_w$, end of cheln. (AMU) | 56000 | 67000 | 50000 |
| $M_n$, end of cheln. (AMU) | 20000 | 23000 | 19000 |
| $M_w/M_n$, end of cheln. | 2.7 | 2.9 | 2.6 |
| Weight % siloxane (%) - IPA precipitation | 4.78 | 4.9 | 4.77 |
| Weight % siloxane (%) - MeOH precipitation | — | — | — |
| Siloxane Incorporation Efficiency (%) | 96 | 98 | 95 |
| Tail (%) | — | — | — |
| Biphenyl (%) | 1.26 | 1.16 | 1.26 |
| External Mannich (%) | — | — | — |
| Internal Mannich (%) | — | — | — |
| OH (ppm) | — | — | 1532 |

The average rate of temperature increase in ° C./minute, or ramp slope, is a heretofore unrecognized factor in achieving improved polysiloxane incorporation into block copolymer and polysiloxane contents of 15 weight percent or more in the thermoplastic composition as a whole. In Comparative Examples 1-4, 6, and 7, summarized in Table 3 and corresponding to Comparative Examples 1-4, 6, and 7 of Carrillo US2009/0318635 A1, the polysiloxane was 20 weight percent of the monomer charge. However, the maximum amount of polysiloxane actually incorporated into the block copolymer of these examples was 14 weight percent (in Comparative Example 4)—an incorporation efficiency of only 59 percent. Each of these examples had a ramp slope of 1.9° C./minute. In present Examples 1-4 set forth in Table 3, the same amount of polysiloxane was charged—20 weight percent. However, the ramp slope was decreased from 1.9° C./minute to 0.2° C./minute. The result was that the incorporation efficiency was increased from 26 to 72 percent (Comparative Examples 6 and 7, respectively) to 87 to 91 percent (Examples 1 and 3, respectively). Moreover, the maximum amount of polysiloxane incorporated was increased from 14 weight percent (Comparative Example 4) to 20.4 to 21.9 weight percent (Examples 1, 3, and 4). These are unexpected results, as there was no prior suggestion that the ramp slope of the polymerization would affect polysiloxane incorporation efficiency and the maximum amount of polysiloxane incorporation that can be achieved by this process.

The unexpected nature of this result is further highlighted by Comparative Examples 8-10, also summarized in Table 2. In these examples, the polysiloxane was 5 weight percent of the monomer charge. The ramp slope was varied from 0.37° C. per minute (Comparative Example 9) to 2.2° C. per minute (Comparative Example 10). However, the polysiloxane incorporation was relatively constant in these examples—4.8 to 5.0 weight percent. Taken alone, these results suggest that ramp slope has little or no affect on polysiloxane incorporation efficiency.

Figure 2:
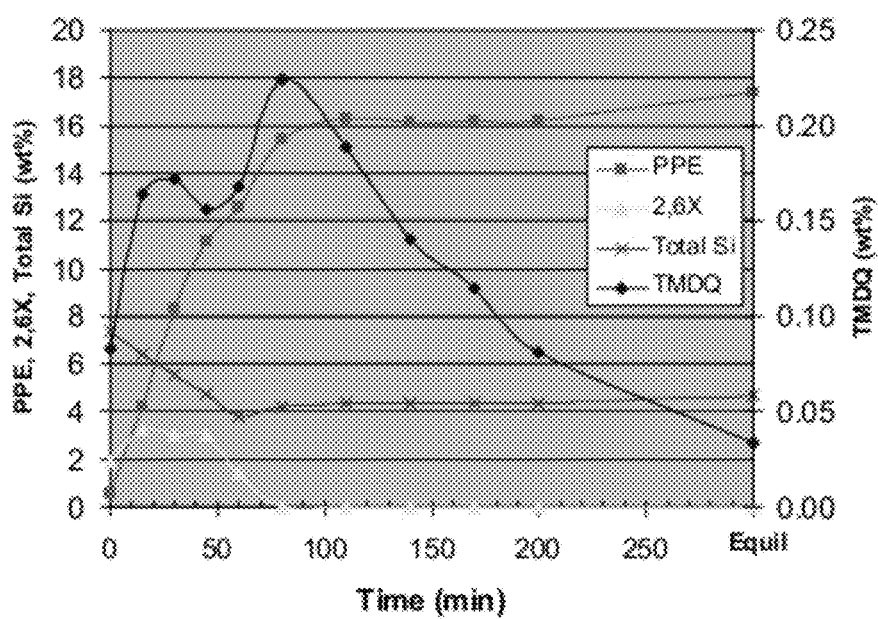
FIG. 2 is a plot of amounts of reaction solution components as determined by $^1$H NMR spectroscopy as a function of reaction time for Example 3. "PPE" refers to 2,6-dimethyl-1,4-phenylene ether repeat units, "2,6" to 2,6-dimethylphenol monomer, "Total Si" to dimethylsiloxane repeat units in both the hydroxyaryl-terminated polysiloxane and the poly(arylene ether)-polysiloxane block copolymer, and "TMDQ" to 3,3', 5,5'-tetramethyl-4,4'-diphenoquinone.

In addition to the data reported above, extensive sampling was carried out during the reaction of Example 3 in order to investigate the molecular weight build and the siloxane incorporation throughout the reaction. FIG. 1 shows the molecular weight of the thermoplastic composition as a function of reaction time as measured by GPC on toluene solution (BF) and methanol-precipitated dry powder (DP) samples. FIG. 2 shows the concentration of reaction solution components as a function of reaction time as determined by $^1$H NMR spectroscopy, where weight percents are based on the total weight of the reaction mixture. It is clear from FIG. 2 that the 2,6-dimethylphenol monomer (shown as "2,6X" in the legend) builds up at the beginning of the reaction, but later gets consumed as fast as it is added. In FIG. 2, the line labeled "PPE" shows that concentration of 2,6-dimethyl-1,4-phenylene ether units as a function of reaction time and includes contributions from both poly(arylene ether) homopolymer and poly(arylene ether)-polysiloxane block copolymer. The line labeled "Total Si" shows the concentration of dimethylsiloxane units as a function of reaction time and includes contributions from both the eugenol-capped polydimethylsiloxane starting material and the polydimethylsiloxane blocks of poly(arylene ether)-polydimethylsiloxane block copolymer. The "Total Si" line starts at a maximum because all of the eugenol-capped polydimethylsiloxane is present when the reaction is initiated, and it declines between 0 and 60 minutes because of dilution due to gradual addition of 2,6-dimethylphenol. The by-product 3,3',5,5'-tetramethyl-1,4-diphenoquinone (TMDQ) builds from the beginning of the reaction and starts incorporation (equilibration) into the polymer chain as soon as all the 2,6-dimethylphenol is used up. Note that the TMDQ amount is on the right vertical axis, which is a much smaller scale than the other components.

Figure 3:
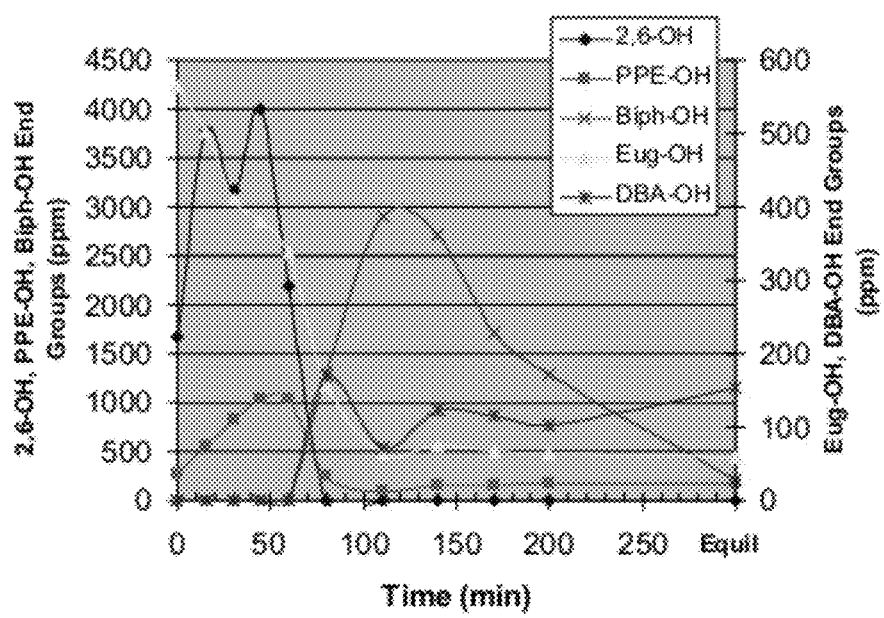
FIG. 3 is a plot of amounts of reaction solution components having hydroxyaryl end groups as determined by $^{31}$P NMR spectroscopy as a function of reaction time for Example 3. "2,6-OH" refers to 2,6-dimethylphenol monomer, "PPE-OH" to 3,5-dimethyl-4-hydroxy-1-phenyl end groups, "Biph-OH" to 2,6-dimethyl-4-(3,5-dimethyl-4-hydroxyphenyl)-phenol end groups, "Eug-OH" to eugenol-derived (3-(3-methoxy-4-hydroxy)propyl) end groups, and "DBA-OH" to 3-methyl-4-hydroxy-5-di-n-butylaminomethyl-1-phenyl end groups (i.e., Mannich end groups).

FIG. 3 show results of a phosphorus-31 nuclear magnetic resonance ($^{31}$P NMR) analysis of components of the reaction solution having hydroxyaryl end groups as a function of reaction time for Example 3. The hydroxyaryl groups were derivatized with phosphorus as described in K. P. Chan et al., "Facile Quantitative Analysis of Hydroxyl End Groups of Poly(2,6-dimethyl-1,4-phenylene oxide)s by $^{31}$P NMR Spectroscopy", Macromolecules, volume 27, pages 6371-6375 (1994). The pattern for 2,6-dimethylphenol monomer concentration ("2,6-OH" in the legend) is consistent with the pattern observed by $^1$H NMR depicted in FIG. 2, in that the concentration increases from 0 to about 20 minutes (because 2,6-dimethylphenol is being added to the reaction mixture), plateaus from about 20 to about 40 minutes, and declines from about 40 to about 70 minutes. The concentration of poly(2,6-dimethyl-1,4-phenylene ether) head groups ("PPE-OH" in the legend) increases until the end of the exotherm at about 60 to 70 minutes, then declines from about 70 to about 100 minutes, and is nearly constant from 100 minutes onward. After the end of the exotherm, the concentration of the poly(arylene ether)-polysiloxane block copolymer starts to build, as indicated indirectly by the decline in the poly(arylene ether) head groups and the decline in eugenol end groups of the eugenol-capped polydimethylsiloxane. Also after the end of the exotherm, the TMDQ begins getting incorporated into the terminal position of the polymer chain, as indicated by the increase in the biphenol curve ("Biph-OH") between 60 and 120 minutes; Mannich amine-substituted phenolic end groups start forming, as indicated by the increase in the "DBA-OH" curve between 60 and 80 minutes. From about 120 minutes forward, the terminal biphenol units are converted to internal biphenoxy units, as indicted by the decrease in the biphenol curve ("Biph-OH").

Figure 4:
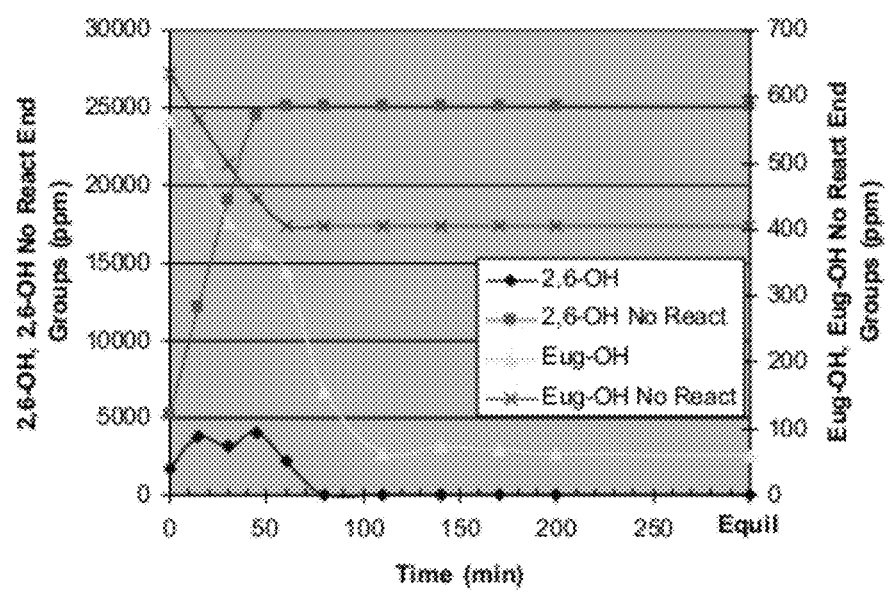
FIG. 4 is a plot of measured concentration of 2,6-dimethylphenol ("2,6-OH") monomer and eugenol-capped polysiloxane ("Eug-OH") end groups (by phosphorus-derivatization and $^{31}$P NMR analysis) and calculated concentrations of 2,6-dimethylphenol ("2,6-OH No React") and eugenol-capped polysiloxane end groups ("Eug-OH No React") assuming none of the groups reacted, in the reaction solution as a function of reaction time for Example 3.

FIG. 4 is a plot of measured concentrations of 2,6-dimethylphenol and eugenol-capped polysiloxane end groups (by $^{31}$P NMR analysis after phosphorus derivatization) and calculated (theoretical) concentrations of 2,6-dimethylphenol and eugenol-capped polysiloxane end groups, assuming none of the phenolic groups react, in the reaction solution as a function of reaction time for Example 3. It can be seen from FIG. 4 that the eugenol-capped polysiloxane ("Eug-OH") only starts incorporating into the poly(arylene ether)-polysiloxane block copolymer after all the 2,6-dimethylphenol has reacted. Note that the initial decline in eugenol-capped polysiloxane concentration from 0 to about 60 minutes is attributable to dilution based on the addition of 2,6-dimethylphenol solution to the reaction mixture.

The components of the thermoplastic composition— diblock plus triblock poly(arylene ether)-polysiloxane block copolymers, bifunctional poly(arylene ether) homopolymer, and monofunctional poly(arylene ether) homopolymer—can be estimated from $^1$H NMR data based on the following assumptions. First, when the copolymer is isolated by precipitation from isopropanol (IPA), all the residual (unreacted) eugenol-capped polysiloxane is removed. This assumption is based on the fact that eugenol-capped polysiloxane has good solubility in isopropanol. Second, every polymer chain has either a eugenol-capped polysiloxane group, a 2,6-dimethylphenol tail (Formula (III)), or a biphenyl group (Formula (II)). Third, any given polymer chain cannot have more than one of the above mentioned groups. The second and third assumptions rest on the generally accepted poly(arylene ether) polymerization mechanism in which an incoming monomer unit attacks the unsubstituted para position of the terminal (tail) unit of a growing poly(arylene ether) chain, thereby forming a reactive quinone ketal intermediate. In other words, in the thermoplastic composition isolated from precipitation in isopropanol, the "eugenol-capped polysiloxane group" is present in and a proxy for poly(arylene ether)-polysiloxane diblock copolymer and polysiloxane-poly(arylene ether)-polysiloxane triblock copolymer; "2,6-dimethylphenol tail" is present in and a proxy for head-to-tail poly(2,6-dimethyl-1,4-phenylene ether) (i.e., monofunctional or hydroxyl-monoterminated 2,6-dimethylphenol homopolymer); and "biphenyl group" is present in and a proxy for poly(2,6-dimethyl-1,4-phenylene ether) containing a single biphenyl group per molecule (i.e., bifunctional or hydroxy-diterminated 2,6-dimethylphenol homopolymer). Fourth, no significant branching exists in the samples. This assumption is based on the fact that there was no detection by $^1$H NMR of peaks that would have been expected from branch point hydrogen atoms. Fifth, the polydispersity of the eugenol-capped polysiloxane will not impact the analysis. Sixth, the polysiloxane moiety of the eugenol-capped polysiloxane has on average 282 hydrogen atoms per chain (i.e., the polysiloxane moiety actually contains, on average, 47 dimethylsiloxane repeat units per molecule, notwithstanding the Table 3 "Polysiloxane chain length" nominal values of 45 dimethylsiloxane repeat units).

Figure 5:
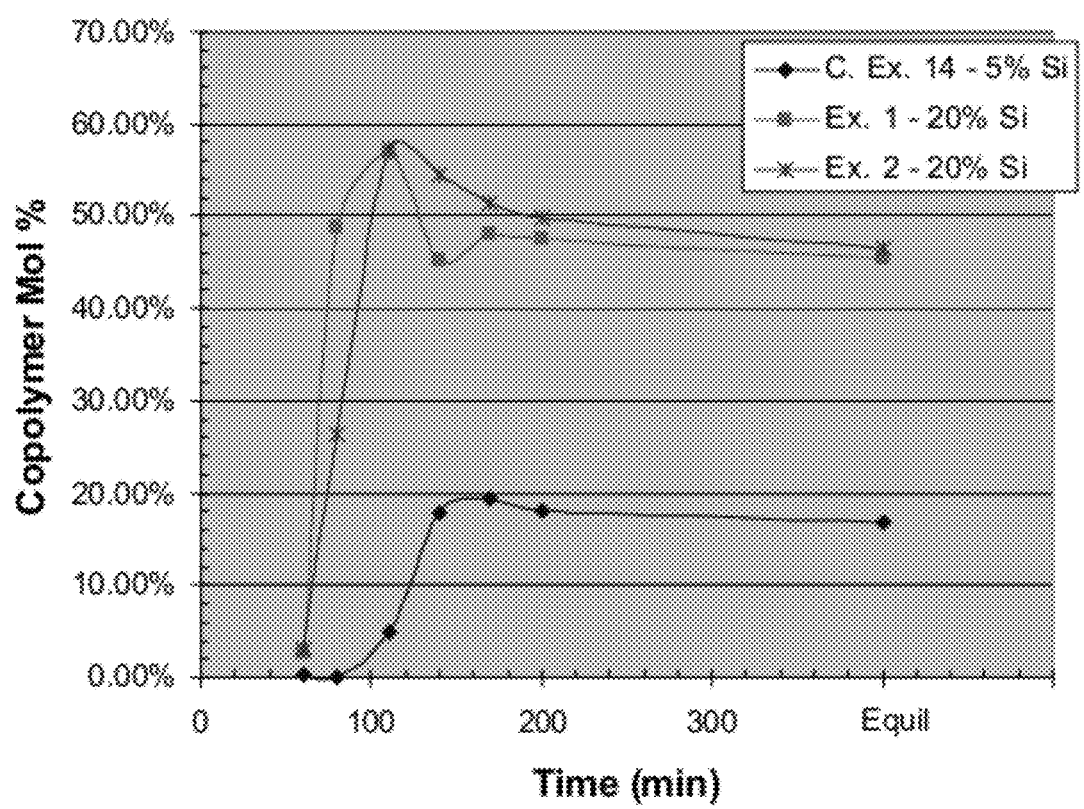
FIG. 5 is a plot of total poly(arylene ether)-polysiloxane block copolymer (diblock and triblock) amount as a function of reaction time for Comparative Example 14 and Examples 1 and 2.
Figure 6:
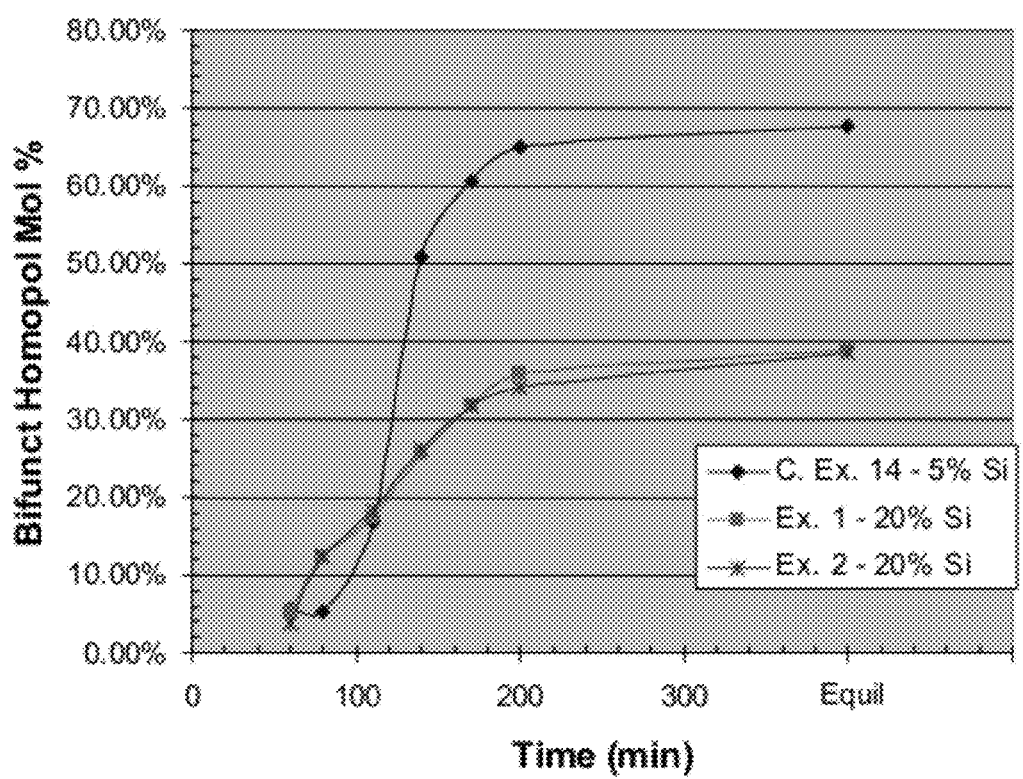
FIG. 6 is a plot of bifunctional poly(arylene ether) homopolymer amount as a function of reaction time for Comparative Example 14 and Examples 1 and 2.
Figure 7:
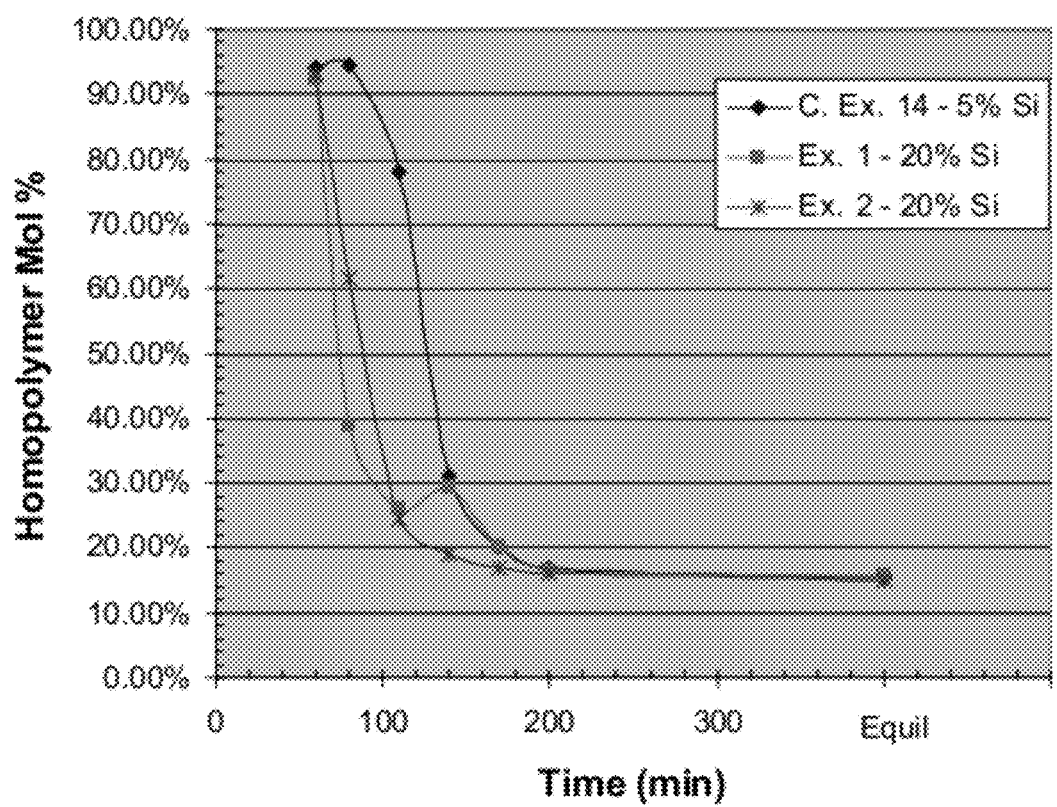
FIG. 7 is a plot of monofunctional poly(arylene ether) homopolymer amount as a function of reaction time for Comparative Example 14 and Examples 1 and 2.

Based on the above assumptions and $^1$H NMR data, the amounts of the major components of the thermoplastic composition as a function of reaction time were calculated and are depicted in FIGS. 5 (poly(arylene ether)-polysiloxane block copolymer), 6 (bifunctional poly(arylene ether) homopolymer), and 7 (monofunctional poly(arylene ether) homopolymer). Data are presented for a poly(arylene ether)-polysiloxane block copolymer made with a 5% polysiloxane loading corresponding to Comparative Example 14, and two different poly(arylene ether)-polysiloxane block copolymers made with a 20% polysiloxane loading, corresponding to Examples 1 and 2. As can be seen from FIG. 5, the higher 20% polysiloxane loading results in higher concentrations of poly(arylene ether)-polysiloxane block copolymer. As can be seen from FIG. 7, the final equilibrated concentration of monofunctional poly(arylene ether) homopolymer is not affected by polysiloxane loading.

Figure 8:
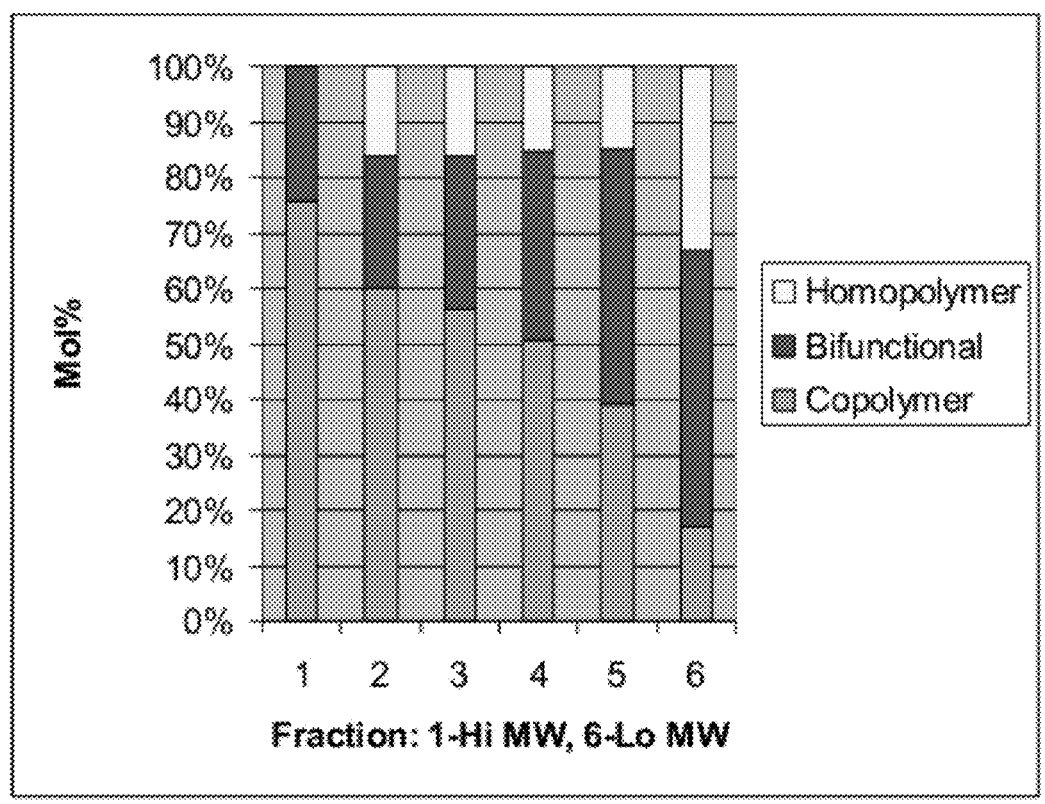
FIG. 8 is a bar chart showing the relative amounts of monofunctional poly(arylene-ether) homopolymer ("homopolymer"), bifunctional poly(arylene ether) homopolymer ("bifunctional"), and poly(arylene ether)-polysiloxane block copolymer ("copolymer") for each of the six fractions from the gel permeation chromatography (GPC) separation of the isopropanol-precipitated thermoplastic composition of Example 2.
Figure 9:
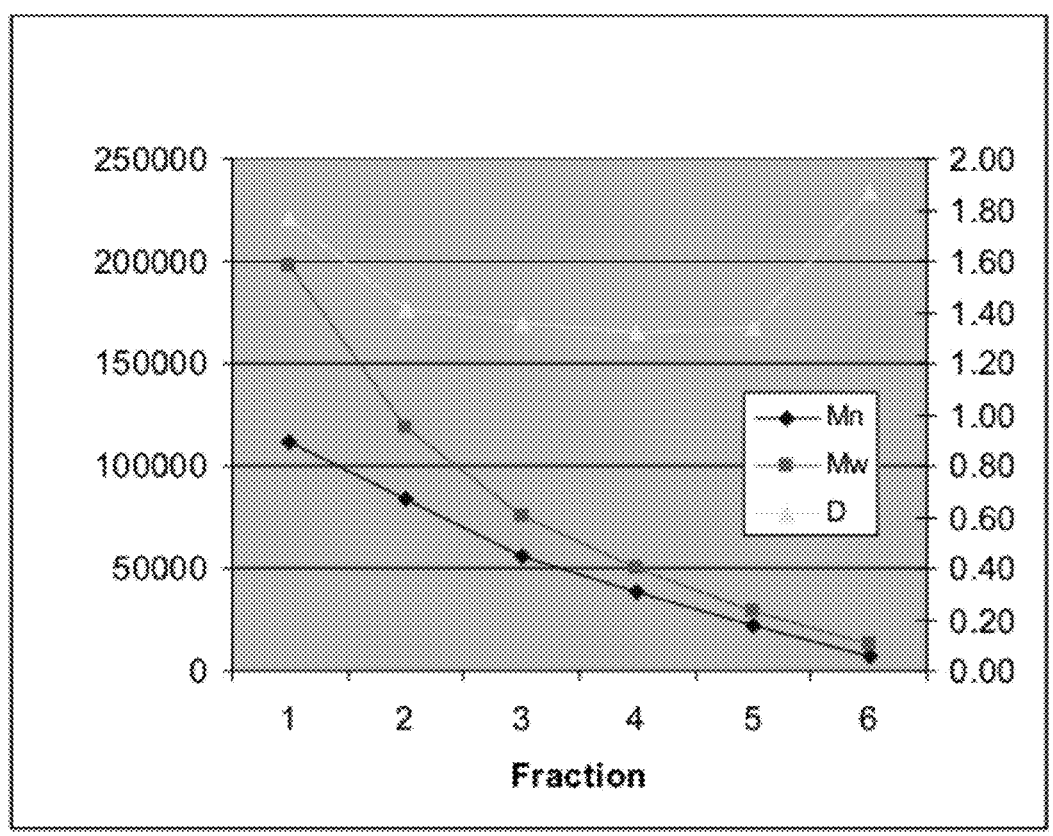
FIG. 9 is a plot of number average molecular weight ("Mn"), weight average molecular weight ("Mw"), and polydispersity ("D"=Mw/Mn) for the six fractions from the GPC separation of the isopropanol-precipitated thermoplastic composition of Example 2.
Figure 10:
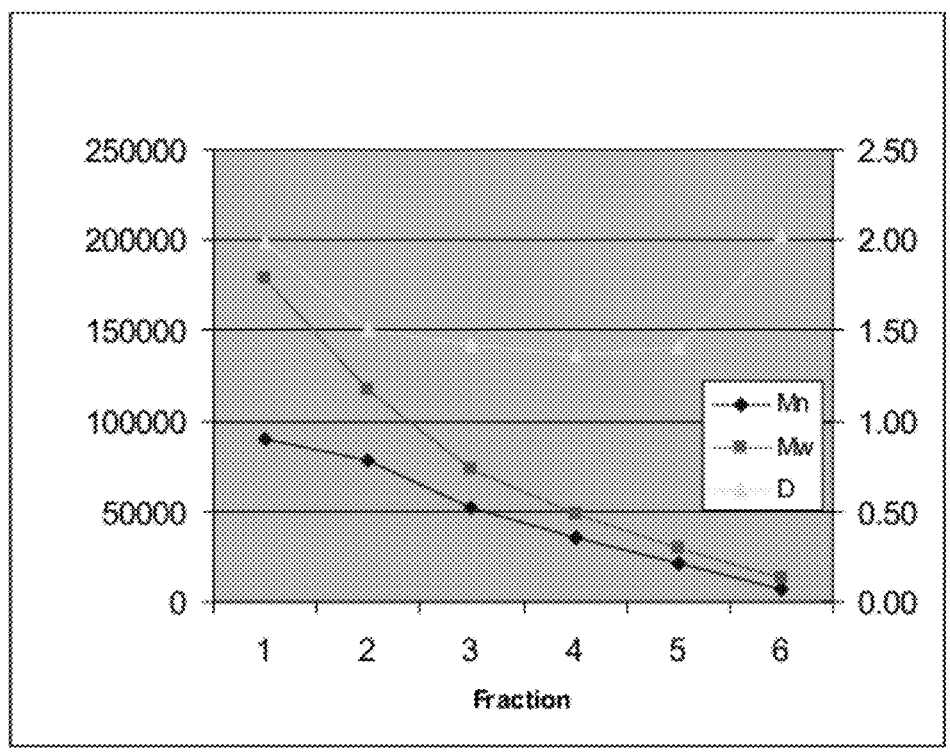
FIG. 10 is a plot of number average molecular weight ("Mn"), weight average molecular weight ("Mw"), and polydispersity ("D"=Mw/Mn) for the six fractions from the GPC separation of the methanol-precipitated thermoplastic composition of Example 2.
Figure 11:
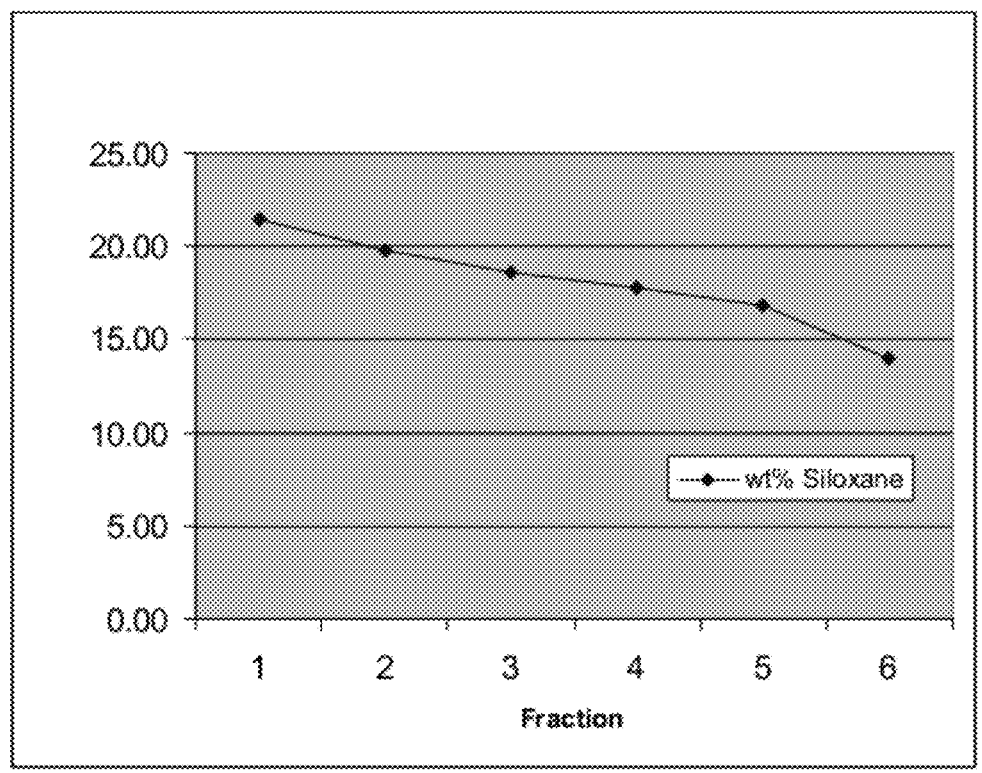
FIG. 11 is a plot of the incorporated polysiloxane (i.e., polysiloxane within poly(arylene ether)-polysiloxane block copolymer) weight percent for the six fractions from the GPC separation of the isopropanol-precipitated thermoplastic composition of Example 2.
Figure 12:
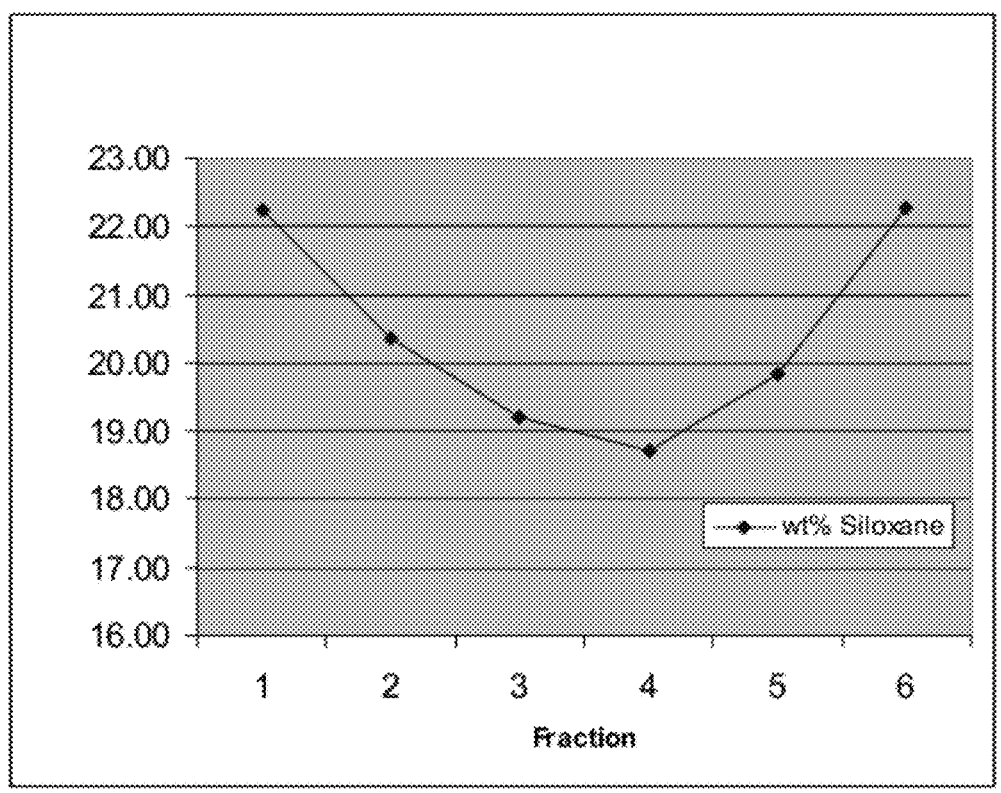
FIG. 12 is a plot of the total polysiloxane weight percent for the six fractions from the GPC separation of the methanol-precipitated thermoplastic composition of Example 2.

For characterization of the Example 2 composition as a function of molecular weight fraction, fractions from six gel permeation chromatography injections (36 mg of total material injected) were collected using a Gilson fraction collector. The effluent eluting between 12 and 25 minutes run time was divided over 60 test tubes which were later recombined to give 6 fractions with each contained approximately 16.67% of the total material (determined from area percent of the chromatogram). A small part (200 microliters) of the five fractions was analyzed by gel permeation chromatography to confirm the success of the fractionation. The remaining part was used for $^1$H NMR analysis. The portion used for NMR analysis was evaporated to dryness at 50° C. under a nitrogen flow. One milliliter of deuterated chloroform (with tetramethylsilane as internal standard) was added and the samples were analyzed by $^1$H NMR (512 scans). Two samples from Example 2 were fractionated—one that had been isolated by precipitation from methanol, and one that was isolated by precipitation from isopropanol. The molecular weight and $^1$H NMR data for each of the fractions are summarized in Tables 4 and 5, respectively. "D" is the polydispersity of the molecular weight distribution (i.e., $M_w/M_n$). FIG. 8 is a bar chart showing the relative amounts of monofunctional poly(arylene ether) homopolymer, bifunctional poly(arylene ether) homopolymer, and poly(arylene ether)-polysiloxane block copolymer for each of the six fractions from the isopropanol-precipitated thermoplastic composition of Example 2. It can be seen from FIG. 8 that that the amount of poly(arylene ether)-polysiloxane block copolymer is highest for the highest molecular weight fraction (Fraction 1). And the highest molecular weight fraction (Fraction 1) is essentially free of monofunctional poly(arylene ether) homopolymer. As the molecular weight of the fraction decreases (i.e., as one moves from fraction 1 to fraction 6), the mole percent of poly(arylene ether)-polysiloxane block copolymer decreases, and the mole percents of monofunctional and bifunctional poly(arylene ether) homopolymer increase. FIGS. 9 and 10 are plots of number average molecular weight ($M_n$), weight average molecular weight ($M_w$), and polydispersity ($M_w/M_n$) for the six fractions from the isopropanol-precipitated (FIG. 9) and methanol-precipitated (FIG. 10) samples of the thermoplastic composition of Example 2. FIGS. 11 and 12 are plots of siloxane amount for the six fractions from the GPC separation of the isopropanol-precipitated (FIG. 11) and methanol-precipitated (FIG. 12) samples of the thermoplastic composition of Example 2. The results are consistent with formation of poly(arylene ether)-polysiloxane block copolymer during the later, "build", stage of the reaction. In addition, the results show that the higher molecular weight fractions include a greater proportion of poly(arylene ether)-polysiloxane block copolymer.

TABLE 4

| Sample | $M_n$ | $M_w$ | D |
|---|---|---|---|
| From Final Dry Powder II (IPA ppt) | | | |
| Fraction 1 (Hi MW) | 111800 | 197400 | 1.77 |
| Fraction 2 | 84100 | 119000 | 1.41 |
| Fraction 3 | 56000 | 76100 | 1.36 |
| Fraction 4 | 38000 | 50200 | 1.32 |
| Fraction 5 | 21600 | 29000 | 1.34 |
| Fraction 6 (Lo MW) | 6960 | 13000 | 1.87 |
| From Final Dry Powder III (MeOH ppt) | | | |
| Fraction 1 (Hi MW) | 89500 | 178500 | 1.99 |
| Fraction 2 | 77700 | 117000 | 1.51 |
| Fraction 3 | 52000 | 73800 | 1.42 |
| Fraction 4 | 35800 | 48700 | 1.36 |
| Fraction 5 | 20900 | 29400 | 1.41 |
| Fraction 6 (Lo MW) | 6570 | 13300 | 2.02 |

TABLE 5

| | Weight % | | | | | | Mole % | | |
|---|---|---|---|---|---|---|---|---|---|
| | % Si | % TMDQ | % Biphenyl | % PPE-tail | % Ext. Mannich | % Int. Mannich | Block Copoly. | Bifunct. Homo. | Monofunct. Homo. |
| From Dry Powder (IPA ppt.) | | | | | | | | | |
| Fraction 1 (High MW) | 21.44 | 0.1278 | 0.5500 | 0.0000 | 0.4354 | 0.1881 | 75.8% | 24.2% | 0.0% |
| Fraction 2 | 19.84 | 0.0200 | 0.6132 | 0.2140 | 0.3467 | 0.1688 | 60.1% | 23.6% | 16.3% |
| Fraction 3 | 18.64 | 0.0110 | 0.7050 | 0.2120 | 0.4119 | 0.1613 | 56.2% | 27.5% | 16.3% |
| Fraction 4 | 17.79 | 0.0150 | 0.9185 | 0.2086 | 0.5261 | 0.2032 | 50.5% | 34.2% | 15.3% |
| Fraction 5 | 16.81 | 0.0230 | 1.4924 | 0.2434 | 0.7345 | 0.1291 | 39.0% | 46.2% | 14.8% |
| Fraction 6 (Low MW) | 13.97 | 0.2802 | 2.9032 | 0.9930 | 1.9050 | 0.7165 | 17.1% | 49.8% | 33.1% |
| From Dry Powder (MeOH ppt.) | | | | | | | | | |
| Fraction 1 (High MW) | 22.23 | 0.1757 | 0.8163 | 0.0000 | 0.7144 | 0.6761 | — | — | — |
| Fraction 2 | 20.36 | 0.0370 | 0.6320 | 0.1423 | 0.4525 | 0.2332 | — | — | — |
| Fraction 3 | 19.20 | 0.0480 | 0.7040 | 0.1316 | 0.4834 | 0.2407 | — | — | — |
| Fraction 4 | 18.71 | 0.0220 | 0.9921 | 0.2468 | 0.6049 | 0.3082 | — | — | — |
| Fraction 5 | 19.83 | 0.0310 | 1.4468 | 0.2234 | 0.9622 | 0.1989 | — | — | — |
| Fraction 6 (Low MW) | 22.27 | 0.3964 | 2.5104 | 1.0345 | 2.2067 | 0.9675 | — | — | — |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a thermoplastic composition, comprising oxidatively copolymerizing a monohydric phenol and a hydroxyaryl-terminated polysiloxane;
   wherein said oxidatively polymerizing the monohydric phenol and the hydroxyaryl-terminated polysiloxane comprises a monohydric phenol addition period characterized by a first temperature, a build period following the addition period and characterized by a second temperature greater than the first temperature, and a temperature ramp period between the addition period and the build period; and
   wherein the temperature ramp period comprises increasing the temperature at an average rate of about 0.01 to about 0.35° C. per minute; and
   wherein the thermoplastic composition incorporates greater than 80 weight percent of the hydroxyaryl-terminated polysiloxane into the poly(arylene ether)-polysiloxane block copolymer; and
   wherein the thermoplastic composition has a weight average molecular weight of 35,000 to about 150,000 atomic mass units.

2. The method of claim 1, wherein the first temperature is about 20 to about 60° C., and the second temperature is about 30 to about 70° C.

3. The method of claim 1, wherein the oxidative copolymerization is conducted with a reaction time greater than or equal to 110 minutes.

4. The method of claim 1, wherein the reaction time comprises a build time of about 30 to about 240 minutes.

5. The method of claim 1, wherein the oxidative copolymerization is initiated in the presence of less than 50 weight percent of the total hydroxyaryl-terminated polysiloxane used.

6. The method of claim 1, wherein the oxidative copolymerization is initiated in the presence of less than 50 weight percent of the total monohydric phenol used.

7. The method of claim 6, wherein addition of remaining monohydric phenol occurs before the temperature ramp period and at the first temperature.

8. The method of claim 1, wherein the hydroxyaryl-terminated polysiloxane comprises, on average, about 20 to about 80 siloxane repeating units.

9. The method of claim 1, wherein the hydroxyaryl-terminated polysiloxane constitutes greater than 8 to about 30 weight percent of the combined weight of the monohydric phenol and the hydroxyaryl-terminated polysiloxane.

10. The method of claim 1, wherein the thermoplastic composition comprises greater than 8 to about 30 weight percent siloxane repeating units and about 70 to less than 92 weight percent arylene ether repeating units.

11. The method of claim 1, wherein the thermoplastic composition comprises 15 to about 25 weight percent siloxane repeating units and about 75 to 85 weight percent arylene ether repeating units.

12. The method of claim 1,
   wherein the monohydric phenol is 2,6-dimethylphenol;
   wherein the hydroxyaryl-terminated polysiloxane is a eugenol-capped polydimethylsiloxane comprising about 20 to about 60 dimethylsiloxane units;
   wherein the oxidative copolymerization is conducted with a reaction time of 170 to 220 minutes;
   wherein the temperature ramp period comprises increasing the temperature at an average rate of about 0.1 to about 0.3° C. per minute;
   wherein the hydroxyaryl-terminated polysiloxane constitutes about 10 to about 28 weight percent of the combined weight of the monohydric phenol and the hydroxyaryl-terminated polysiloxane;
   wherein the thermoplastic composition incorporates greater than 85 weight percent of the hydroxyaryl-terminated polysiloxane into the poly(arylene ether)-polysiloxane block copolymer;
   wherein the thermoplastic composition comprises 15 to about 25 weight percent siloxane repeating units and about 75 to 85 weight percent arylene ether repeating units.

13. A thermoplastic composition prepared by the method of claim 1, wherein the composition comprises greater than 8 to about 30 weight percent siloxane repeating units and about 70 to less than 92 weight percent arylene ether repeating units.

14. The thermoplastic composition of claim 13, wherein the thermoplastic composition comprises 15 to about 25 weight percent siloxane repeating units and about 75 to 85 weight percent arylene ether repeating units.

15. The thermoplastic composition of claim 13, wherein the hydroxyaryl-terminated polysiloxane comprises, on average, about 35 to about 80 siloxane repeating units.

16. The thermoplastic composition of claim 13,
   wherein the monohydric phenol is 2,6-dimethylphenol;
   wherein the hydroxyaryl-terminated polysiloxane is a eugenol-capped polydimethylsiloxane comprising 35 to 60 dimethylsiloxane units;
   wherein the thermoplastic composition comprises 15 to about 25 weight percent siloxane repeating units and about 75 to 85 weight percent arylene ether repeating units.

17. A thermoplastic composition, comprising:
   a poly(arylene ether); and
   a poly(arylene ether)-polysiloxane block copolymer comprising
      a poly(arylene ether) block, and
      a polysiloxane block comprising, on average, about 20 to about 80 siloxane repeating units;
   wherein the thermoplastic composition comprises greater than 8 to about 30 weight percent siloxane repeating units and about 70 to less than 92 weight percent arylene ether repeating units, based on the total weight of the poly(arylene ether) and the poly(arylene ether)-polysiloxane block copolymer;
   wherein the thermoplastic composition is the product of a process comprising oxidatively copolymerizing a monomer mixture comprising a monohydric phenol and a hydroxyaryl-terminated polysiloxane; and
   wherein the thermoplastic composition has a weight average molecular weight of 35,000 to about 150,000 atomic mass units.

18. The thermoplastic composition of claim 17, wherein the thermoplastic composition comprises 15 to about 25 weight percent siloxane repeating units and about 75 to 85 weight percent arylene ether repeating units.

19. The thermoplastic composition of claim 17, wherein the thermoplastic composition has an intrinsic viscosity of at least 0.3 as measured at 25° C. in chloroform.

20. The thermoplastic composition of claim 17, wherein the thermoplastic composition has an intrinsic viscosity of 0.3 to 0.6 deciliter per gram as measured at 25° C. in chloroform.

21. The thermoplastic composition of claim 17, wherein the thermoplastic composition comprises less than 20 weight percent of molecules having a molecular weight less than 10,000 atomic mass units.

22. The thermoplastic composition of claim 17, wherein the molecules having a molecular weight less than 10,000 atomic mass units comprise, on average, about 10 to about 18 weight percent siloxane repeating units.

23. The thermoplastic composition of claim 17, wherein the thermoplastic composition comprises less than 26 weight percent of molecules having a molecular weight greater than 100,000 atomic mass units.

24. The thermoplastic composition of claim 17, wherein the molecules having a molecular weight greater than 100,000 atomic mass units comprise, on average, about 17 to about 25 weight percent siloxane repeating units.

25. The thermoplastic composition of claim 17,
wherein the thermoplastic composition comprises less than 20 weight percent of molecules having a molecular weight less than 10,000 atomic mass units; and
wherein the thermoplastic composition comprises less than 26 weight percent of molecules having a molecular weight greater than 100,000 atomic mass units.

26. The thermoplastic composition of claim 17,
wherein the molecules having a molecular weight less than 10,000 atomic mass units comprise, on average, about 10 to about 18 weight percent siloxane repeating units;
wherein the molecules having a molecular weight greater than 100,000 atomic mass units comprise, on average, about 17 to about 25 weight percent siloxane repeating units.

27. The thermoplastic composition of claim 17, wherein the hydroxyaryl-terminated polysiloxane comprises 35 to about 60 siloxane repeating units.

28. The thermoplastic composition of claim 17, wherein the hydroxyaryl-terminated polysiloxane comprises about 40 to about 50 siloxane repeating units.

29. The thermoplastic composition of claim 17, wherein the monohydric phenol consists of 2,6-dimethylphenol, and wherein the thermoplastic composition comprises less than or equal to 0.4 weight percent of 2,6-dimethylphenoxy tail end groups.

30. The thermoplastic composition of claim 17, wherein the monohydric phenol consists of 2,6-dimethylphenol, and wherein the thermoplastic composition comprises 0.1 to 0.4 weight percent of 2,6-dimethylphenoxy tail end groups.

31. The thermoplastic composition of claim 17, wherein the monohydric phenol consists of 2,6-dimethylphenol, and wherein the thermoplastic composition comprises 0.1 to 2.0 weight percent of 2,6-dimethyl-4-(3,5-dimethyl-4-hydroxyphenyl)-phenoxy groups.

32. The thermoplastic composition of claim 17,
wherein the poly(arylene ether) block comprises arylene ether repeating units having the structure

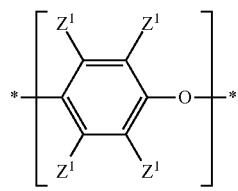

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom;

wherein the polysiloxane block comprises repeating units having the structure

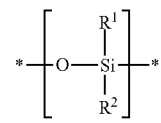

wherein each occurrence of $R^1$ and $R^2$ is independently hydrogen, $C_1$-$C_{12}$ hydrocarbyl or $C_1$-$C_{12}$ halohydrocarbyl; and wherein the polysiloxane block further comprises a terminal unit having the structure

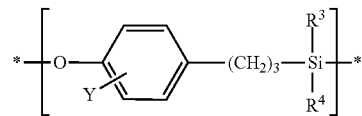

wherein Y is hydrogen, $C_1$-$C_{12}$ hydrocarbyl, $C_1$-$C_{12}$ hydrocarbyloxy, or halogen, and wherein each occurrence of $R^3$ and $R^4$ is independently hydrogen, $C_1$-$C_{12}$ hydrocarbyl or $C_1$-$C_{12}$ halohydrocarbyl.

33. The thermoplastic composition of claim 17,
wherein the poly(arylene ether) block comprises arylene ether repeating units having the structure

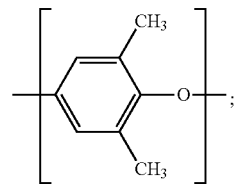

and
wherein the polysiloxane block has the structure

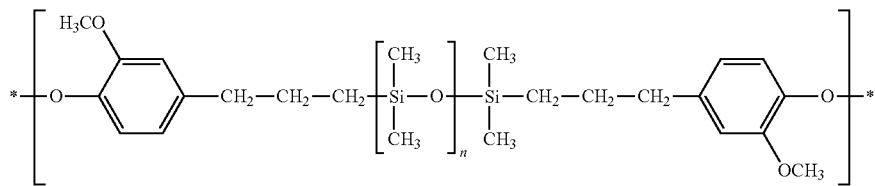

wherein n is 35 to 60; and
wherein the thermoplastic composition has a number average molecular weight of 10,000 to 30,000 atomic mass units.

34. A polymer blend, comprising:
about 5 to about 95 weight percent of a polymer selected from the group consisting of polystyrenes, polyamides, polyolefins, polyesters, and combinations thereof; and
about 5 to about 95 weight percent of a thermoplastic composition, comprising
a poly(arylene ether); and
a poly(arylene ether)-polysiloxane block copolymer comprising
a poly(arylene ether) block, and
a polysiloxane block comprising, on average, about 20 to about 80 siloxane repeating units;

wherein the thermoplastic composition comprises greater than 8 to about 30 weight percent siloxane repeating units and about 70 to less than 92 weight percent arylene ether repeating units, based on the total weight of the poly(arylene ether) and the poly(arylene ether)-polysiloxane block copolymer;

wherein the thermoplastic composition is the product of a process comprising oxidatively copolymerizing a monomer mixture comprising a monohydric phenol and a hydroxyaryl-terminated polysiloxane; and wherein the thermoplastic composition has a weight average molecular weight of 35,000 to about 150,000 atomic mass units.

* * * * *